United States Patent
Chen

(10) Patent No.: US 11,062,836 B2
(45) Date of Patent: *Jul. 13, 2021

(54) LLC RESONANT CONVERT WITH INTEGRATED MAGNETICS

(71) Applicant: Texas Instruments Incorporated, Dallas, TX (US)

(72) Inventor: Runruo Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,440

(22) Filed: May 22, 2018

(65) Prior Publication Data

US 2018/0278174 A1  Sep. 27, 2018

Related U.S. Application Data

(63) Continuation of application No. 15/674,836, filed on Aug. 11, 2017, now Pat. No. 10,003,275.

(Continued)

(51) Int. Cl.
*H01F 27/28* (2006.01)
*H02M 3/335* (2006.01)
(Continued)

(52) U.S. Cl.
CPC ....... *H01F 27/2804* (2013.01); *H01F 27/306* (2013.01); *H01F 27/40* (2013.01);
(Continued)

(58) Field of Classification Search
CPC ..... H01F 2027/2804; H01F 2027/2809; H01F 2027/2814; H01F 2027/2819
See application file for complete search history.

(56) References Cited

U.S. PATENT DOCUMENTS 2,137,433 A  11/1938  Wirz
2,611,885 A   9/1952  Bridges
(Continued)

FOREIGN PATENT DOCUMENTS

CN  201639482 U  11/2010
CN  104795224 A   7/2015
(Continued)

OTHER PUBLICATIONS

McDonald et al., "Digital Control Provides LLC Performance Enhancements", Texas Instruments, Power Electronics, Aug. 5, 2013, 9 pgs.

(Continued)

*Primary Examiner* — Peter M Novak
(74) *Attorney, Agent, or Firm* — Valerie M. Davis; Charles A. Brill; Frank D. Cimino

(57) ABSTRACT

Disclosed examples include integrated magnetic circuits for LLC resonant converters, including an inductor cell and multiple transformer cells with cores arranged in a stack structure. The individual transformer cells include primary and secondary windings extending around the transformer core structure, and a secondary transistor connected in series with the secondary winding. One or more windings are shaped near core stack gaps to reduce core and winding losses. The inductor cell includes an inductor winding extending around the inductor core structure to provide the inductor, and the capacitor. The inductor cell is arranged in the stack structure with the transformer cells to magnetically couple the transformer primary windings, the inductor winding and the transformer secondary windings in a single magnetic circuit to cancel cell to cell flux.

23 Claims, 14 Drawing Sheets

Related U.S. Application Data

(60) Provisional application No. 62/421,094, filed on Nov. 11, 2016.

(51) Int. Cl.
*H01F 27/40* (2006.01)
*H01F 27/30* (2006.01)
*H02M 1/00* (2006.01)
*H01F 27/24* (2006.01)

(52) U.S. Cl.
CPC ......... *H02M 3/33576* (2013.01); *H01F 27/24* (2013.01); *H01F 2027/2809* (2013.01); *H02M 2001/0058* (2013.01); *H02M 2001/0064* (2013.01)

(56) References Cited

U.S. PATENT DOCUMENTS

| | | | |
|---|---|---|---|
| 3,531,708 A | | 9/1970 | Kuba |
| 4,675,796 A | | 6/1987 | Gautherin et al. |
| 5,537,089 A | * | 7/1996 | Greif ................ H01F 27/25 336/12 |
| 6,344,979 B1 | | 2/2002 | Huang et al. |
| 7,598,839 B1 | * | 10/2009 | Wedley ............. H01F 3/12 336/131 |
| 8,629,627 B2 | | 1/2014 | Cohen et al. |
| 8,681,520 B2 | | 3/2014 | Tao |
| 8,717,784 B2 | | 5/2014 | Park et al. |
| 9,257,910 B2 | * | 2/2016 | Lindberg-Poulsen ............. H02M 3/33523 |
| 9,257,913 B1 | | 2/2016 | McDonald |
| 9,406,419 B2 | * | 8/2016 | Njiende T. ........ H01F 3/10 |
| 2005/0286270 A1 | | 12/2005 | Petkov et al. |
| 2008/0224809 A1 | | 9/2008 | Zhang et al. |
| 2009/0244933 A1 | | 10/2009 | Wang et al. |
| 2009/0289751 A1 | * | 11/2009 | Nagano ............. H01F 3/10 336/221 |
| 2010/0103710 A1 | | 4/2010 | Reddy |
| 2011/0063065 A1 | | 3/2011 | Hughes Douglas et al. |
| 2011/0063881 A1 | | 3/2011 | Dabak et al. |
| 2011/0299301 A1 | | 12/2011 | Huang |
| 2011/0305044 A1 | | 12/2011 | Huang |
| 2011/0316430 A1 | | 12/2011 | Cohen et al. |
| 2012/0176824 A1 | | 7/2012 | Franklin et al. |
| 2012/0262953 A1 | | 10/2012 | Jungreis et al. |
| 2012/0287680 A1 | | 11/2012 | Luo et al. |
| 2013/0016542 A1 | * | 1/2013 | Nakamura ........ H03K 17/163 363/56.01 |
| 2013/0027170 A1 | | 1/2013 | Chen |
| 2013/0121033 A1 | | 5/2013 | Lehn et al. |
| 2013/0194832 A1 | | 8/2013 | Han et al. |
| 2013/0279205 A1 | | 10/2013 | Keung |
| 2013/0343091 A1 | | 12/2013 | Njiende T. et al. |
| 2014/0268952 A1 | | 9/2014 | Tong |
| 2015/0092455 A1 | | 4/2015 | Won et al. |
| 2016/0020016 A1 | | 1/2016 | Ouyang et al. |
| 2017/0054378 A1 | * | 2/2017 | Njiende T. ........ H01F 30/10 |
| 2017/0133940 A1 | * | 5/2017 | Wilkinson ........ H02M 3/337 |

FOREIGN PATENT DOCUMENTS

| | | |
|---|---|---|
| CN | 106057433 A | 10/2016 |
| EP | 2299456 A1 | 3/2011 |
| EP | 3133614 A1 | 2/2017 |
| WO | WO03032477 A2 | 4/2003 |
| WO | 2008101367 A1 | 8/2008 |

OTHER PUBLICATIONS

Huang, "Designing an LLC Resonant Half-Bridge Power converter", Power Supply Design Seminar, 2010, SEM1900, Topic 3, TI Literature No. SLUP263, available at power.ti.com/seminars, 30 pgs.

UCD3138 Highly Integrated Digital Controller for Isolated Power, Data Manual, Texas Instruments, Literature No. SLUSAP2F, Mar. 2012, Revised Nov. 2013, 78 pgs.

Yan et al., "A Novel Transformer Structure for High Power, High Frequency Converter", Power Electronics Specialists Conference, 2007. PESC 2007. IEEE, 5 pgs.

Yang et al., "LLC Resonant Converter for Front End DC/DC Conversion", Applied Power Electronics Conference and Exposition, 2002. APEC 2002. Seventeenth Annual IEEE, 5 pgs.

Huang et al., "LLC Resonant Converter with Matrix Transformer", IEEE Transaction on Power Electronics, vol. 29, No. 8, Aug. 2014, 9 pgs.

Seeman et al., "Advantages of GaN in a High-Voltage Resonant LLC Converter", Texas Instruments, Applied Power Electronics Conference and Exposition (APEC), 2014 Twenty-Ninth Annual IEEE, Mar. 2014, 8 pgs.

Yang et al., "Integrated Magnetic for LLC Resonant Converter", Applied Power Electronics Conference and Exposition, 2002. APEC 2002. Seventeenth Annual IEEE, 6 pgs.

"Feedback Loop Design of an LLC Resonant Power Converter", Texas Instruments, Application Report, SLUA582A—Oct. 2010—Revised Nov. 2010, 9 pgs.

Pollock et al., "Modelling Foil Winding Configurations with Low AC and DC Resistance", IEEE Power Electronics Specialists Conference, Jun. 2005, pp. 1507-1512.

Hu et al., "Optimization of Shapes for Round Wire, High Frequency Gapped Inductor Windings", IEEE Industry Applications Society Anual Meeting, Oct. 1998, pp. 907-911.

Yang, "Topology Investigation for Front End DC/DC Power Conversion for Distributed Power System", Ph.D. dissertation, Virginia Polytechnic Institute and State University, Sep. 12, 2003, 332 pages.

Fu, "Topology Investigation and System Optimization of Resonant Converters", Ph.D. dissertation, Virginia Polytechnic Institute and State University, Feb. 4, 2010, 211 pages.

Chen et al., "Design and magnetics optimization of LLC resonant converter with GaN," 2017 IEEE Applied Power Electronics Conference and Exposition (APEC), Tampa, FL, 2017, pp. 94-98.

Notification of Transmittal of the International Search Report and the Written Opinion ofthe International Searching Authority, or the Declaration; dated Feb. 21, 2018, 7 pages.

Extended European Search Report for 17869629.0 dated Feb. 3, 2020.

Daocheng Huang, et al.; "LLC Resonant Converter with Matrix Transformer"; IEEE Transactions on Power Electronics, Institute of Electrical and Electronics Engineers, USA; XP011544104; vol. 29, No. 8; Aug. 1, 2014; pp. 4339-4347.

"Power Electronics Handbook, 4th Edition" In Power Electronics Handbook, 4th Edition; Edited by Muhammad H. Rashid; Sep. 29, 2017; Joe Hayton, Oxford, UK; XP055661322; pp. 581-585.

Pollock, et al.; "Gapped-Inductor Foil Windings with Low AC and DC Resistance"; Industry Applications Conference, 2004; 39th IAS Annual Meeting Conference Report of the 2004 IEEE Seattle, WA, USA; Oct. 3-7, 2004: Piscataway NJ; USA vol. 1; Oct. 3, 2004; pp. 552-557.

CNIPA Office Action dated Oct. 13, 2020.

Translation of CNIPA Office Action dated Nov. 13, 2020.

\* cited by examiner

LLC RESONANT CONVERT WITH INTEGRATED MAGNETICS

REFERENCE TO RELATED APPLICATION

Under 35 U.S.C. § 119, this continuation application claims benefits of and priority to U.S. patent application Ser. No. 15/674,836 (TI-77905), filed on Aug. 11, 2017, which claims priority to, and the benefit of, U.S. provisional patent application No. 62/421,094, entitled "Integrated LLC Transformer", and filed on Nov. 11, 2016. The entirety of the above referenced applications is hereby incorporated herein by reference.

BACKGROUND

LLC converters are a form of series resonant converters that provide an output voltage signal isolated from an input signal. LLC converters include a series resonant circuit with a transformer primary winding. A switching circuit alternately couples a switching node of a resonant circuit or tank circuit to a positive supply node and a ground node to provide an alternating resonant current flow through the transformer primary winding. A secondary circuit, such as a rectifier, provides an output voltage to drive a load. The secondary circuit may include synchronous rectifier switches or diode rectifiers. The primary side switching circuit can be adjusted to regulate the output voltage. LLC resonant converters are capable of high efficiency and high power density, and can provide zero voltage switching and low turn off current for primary-side switches over a wide load range. These benefits make LLC resonant converters desirable for a variety of applications, such as high-performance server and telecommunication applications. When the primary side switching frequency is lower than the resonant frequency, the secondary side synchronous rectifier devices can be turned off with zero-current switching. This facilitates voltage gain boost capability without efficiency deterioration for applications with a hold-up time requirement. Operation at high switching frequencies allows reduction of the size of magnetic components and capacitors in LLC resonant converters. However, this increases switching related loss and magnetic component losses, resulting in poor efficiency. Wideband primary side switches, such as gallium nitride (GaN) transistors, can be used to reduce the output capacitance and gate charge to mitigate circulating current loss and gate driving loss to facilitate operation at higher switching frequencies. However, magnetics used for LLC resonant converters remains a limitation to increased converter efficiency due to core loss and winding loss, particularly at high switching frequencies. Further improvements are desirable to support higher efficiencies and power densities for LLC resonant converters.

SUMMARY

The present disclosure presents improved integrated magnetic circuits using stacked core cell structures to integrate resonant circuit inductor and capacitor components as well as transformer primary and secondary circuits for improved LLC resonant converters or other applications. Example integrated magnetic circuits include an inductor cell and multiple transformer cells with inductor and transformer cores arranged in a stack structure to provide a single magnetic circuit to magnetically couple the primary side inductor winding with the transformer primary and secondary windings to facilitate flux cancellation. The individual transformer cells include primary and secondary windings extending around the transformer core structure, and a secondary transistor or diode connected in series with the secondary winding. In certain examples, the secondary circuits include two secondary windings and two corresponding secondary transistors for synchronous rectifier operation. In some examples, the core structures are spaced from one another to provide magnetic circuit gaps. In certain examples, one or more transformer windings are shaped or spaced farther from the core structure near the core stack gaps to reduce core fringing losses. The individual transformer cells can include primary and/or secondary windings formed as traces or other conductive structures on a printed circuit board (PCB), and the secondary transistor or transistors and output capacitors can be mounted on the transformer cell PCB to facilitate a compact design for higher power density. The inductor cell includes a resonant capacitor and an inductor winding extending around the inductor core structure to provide the resonant circuit inductor. In certain examples, the inductor winding can be formed as a conductive structure on an inductor cell PCB, with the resonant capacitor mounted on the inductor cell PCB. Disclosed examples also include power conversion systems that further include a primary side switching circuit, for example including gallium nitride (GaN) transistors, and a control circuit to provide switching control signals to the primary side and secondary side switches to provide a DC output voltage signal.

DETAILED DESCRIPTION

Figure 1:
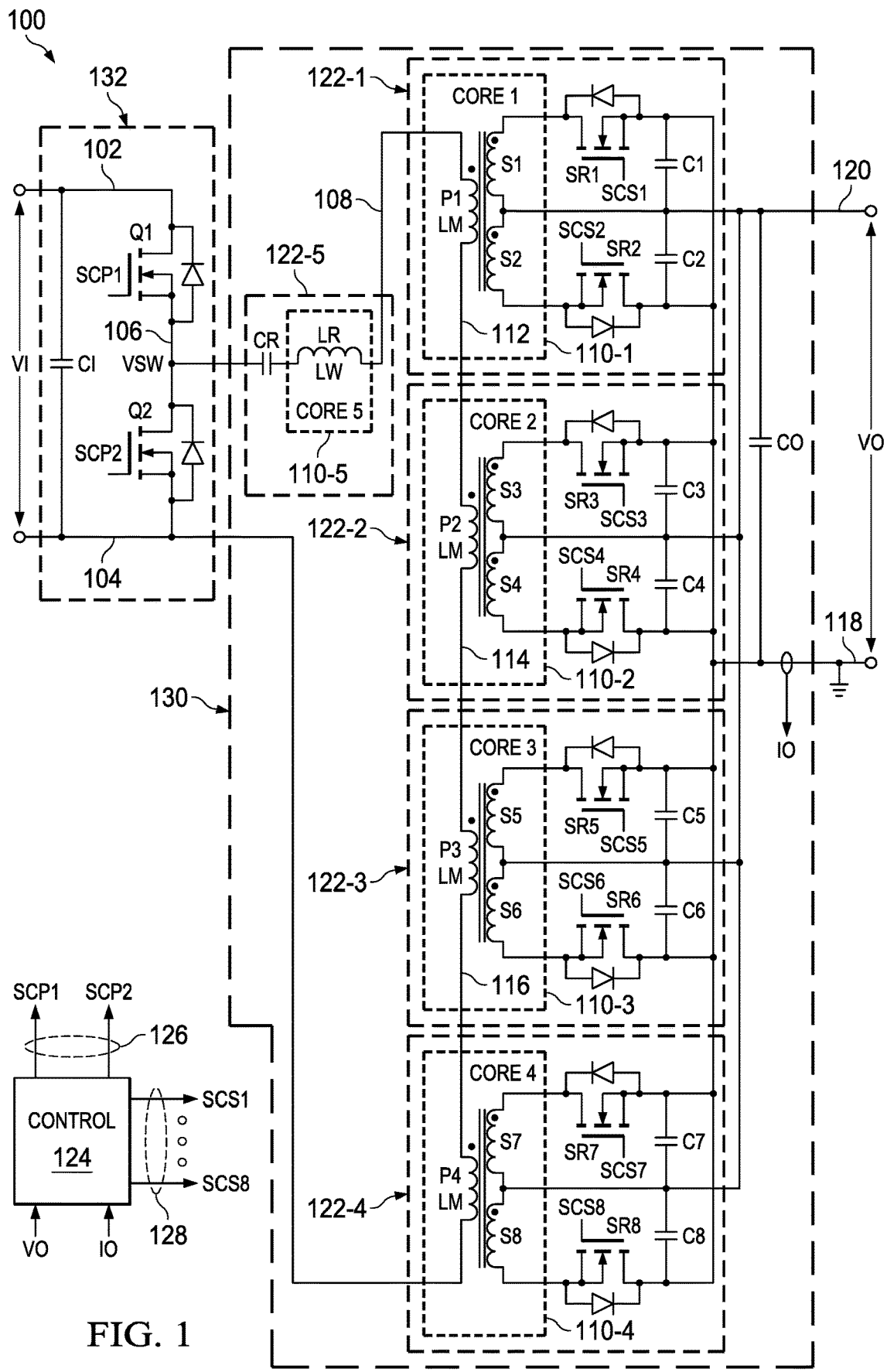
FIG. 1 is a schematic diagram of an example regulated LLC resonant converter with an example integrated LLC transformer.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the terms "couple", "coupled" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 2:
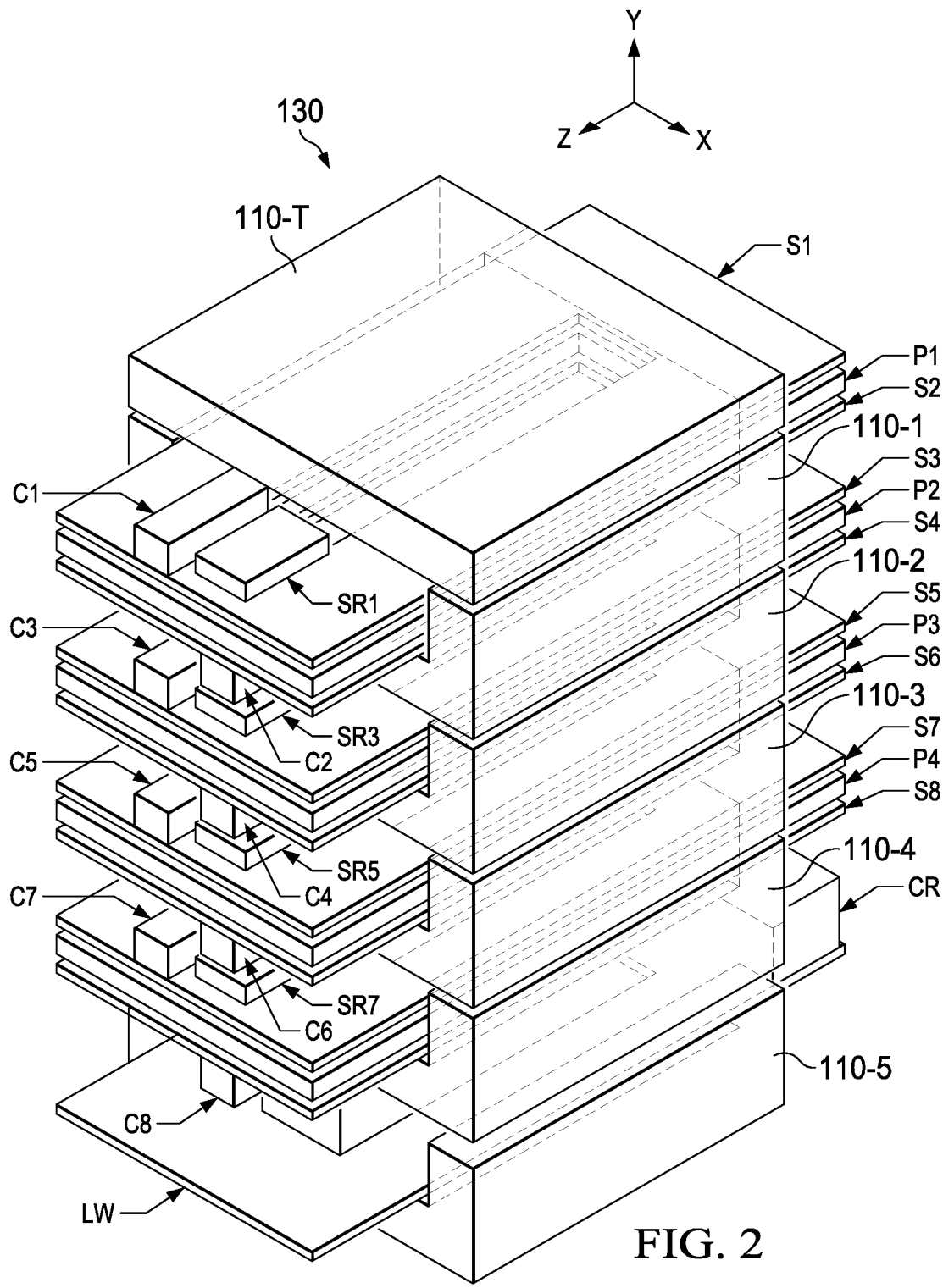
FIG. 2 is a perspective view of an example integrated magnetic circuit with five E-shaped cores and a top core stacked together with four cells for transformer coupling and one cell for an example resonant inductor of the LLC resonant converter.

FIGS. 1 and 2 show a power conversion system implemented as a regulated LLC resonant converter 100 with an integrated LLC transformer magnetic circuit formed as a core stack structure 130. The converter 100 includes first and second input nodes 102 and 104 that receive an input voltage signal VI. In one example, the input signal VI is a DC voltage that is positive at the first input node 102 relative to the second input node 104, and the second input node 104 can be a ground or other reference voltage connection.

The converter 100 includes a switching circuit 132 that provides an alternating voltage VSW at a switching node 106. In the illustrated example, the switching circuit 132 includes a first primary side transistor Q1 connected between the first input node 102 and the switching node 106, as well as a second primary side transistor Q2 connected between the switching node 106 and the second input node 104. In one example, the primary side transistors Q1 and Q2 are n-channel gallium nitride (GaN) field effect transistors (FETs). A drain of Q1 is connected to the first input node 102, and a source of Q1 is connected to the switching node 106. A drain of Q2 is connected to the switching node 106, and a source of Q2 is connected to the second reference node 104. The switches Q1 and Q2 include body diodes and gate control terminals as schematically shown in FIG. 1. The switches Q1 and Q2 operate according to switching control signals SCP1 and SCP2, respectively, to alternately connect the switching node 106 to the first input node 102 (Q1 on when SCP1 is active high) or to connect the switching node 106 to the second input node 104 (Q2 on when SCP2 is active high). In other examples, different types of FETs, bipolar transistors, or other semiconductor-based switches can be used in the primary side switching circuit 132 to control the switching node voltage VSW. In one example, the switching circuit 132 includes an input capacitor CI connected between the first and second input nodes 102 and 104.

A series circuit is connected between the switching node 106 and the second input node 104. The series circuit includes an integer number N transformer primary circuits, where N is greater than 1. In one example, N=4 as shown in FIGS. 1 and 2. In this example, the series circuit includes a capacitor CR, and an inductor LR with an inductor winding LW, and four transformer primary circuits connected in series between the switching node 106 and the second input node 104. In the illustrated example, the primary circuits include a primary winding that provides a primary winding inductance LM (e.g., magnetizing inductance). In this configuration, the capacitor CR is connected between the switching node 106 and the inductor LR, and the inductor LR is connected between the capacitor CR and a node 108.

The core stack structure 130 is formed by cells 122 that individually include a core structure 110 and associated windings. The individual cells 122 may include further circuit components, such as transistors and/or capacitors to provide an integrated magnetic circuit for the power converter 100. The example stack structure 130 of FIGS. 1 and 2 includes four transformer cells 122-1, 122-2, 122-3 and 122-4, as well as an inductor cell 122-5. The converter 100 includes N+1=5 core structures 110-1 through 110-5 (labeled CORE 1, CORE 2, CORE 3, CORE 4 and CORE 5 in FIG. 1). The transformer core structures 110-1 through 110-4 are arranged in a stacked configuration forming the core stack structure 130. The first four core structures 110-1, 110-2, 110-3 and 110-4 are transformer core structures. Associated primary and secondary windings are wound or otherwise formed around at least a portion of a corresponding one of the transformer core structures 110-1, 110-2, 110-3, 110-4. In this example, the bottom core structure 110-5 is an inductor core structure (CORE 5) with one or more associated inductor windings LW to form the series resonant circuit inductor LR. The core stack structure 130 provides a single magnetic circuit to magnetically couple transformer primary circuits, transformer secondary circuits and the resonant inductor LR. The structure advantageously provides complete or at least partial flux cancellation to enhance thermal efficiency in a compact high power density integrated magnetic circuit.

The node 108 is connected to a first primary winding P1 of the first transformer cell 122-1. The primary winding P1 is connected to provide an inductance LM between the node

108 and a node 112. A second transformer cell 122-2 includes a primary winding P2. The winding P2 is connected to provide an inductance LM between the node 112 and a node 114. The third transformer cell 122-3 includes a primary winding P3 connected to provide a further primary inductance LM between the node 114 and a node 116. The fourth transformer cell 122-4 includes a primary winding P4 connected to provide an inductance LM between the node 116 and the second input node 104.

The series resonant circuit in the example of FIG. 1 sequentially connects the resonant capacitor CR, the resonant inductor LR and the transformer primary windings P1-P4 in a series circuit between the switching node 106 and the second input node 104. In other examples, the primary windings P1-P4, the resonant capacitor CR and the resonant inductor LR can be connected in any order in a series circuit between the nodes 104 and 106. In other examples, the individual transformer circuits can include multiple series and/or parallel connected primary windings, and the primary windings of the individual transformer circuits are connected in series with one another.

The inductor core structure 110-5 is arranged with the transformer core structures in the stack to provide magnetic coupling between the transformer primary and secondary circuits. The inductor cell 122-5 includes the inductor winding LW wound or otherwise formed around the inductor core structure 110-5. In the illustrated example, moreover, the resonant capacitor CR is formed as part of the inductor cell 122-5, although not a strict requirement of all possible implementations.

The individual transformer cells 122-1 through 122-4 also include a transformer secondary circuit with one or more secondary windings formed around the corresponding core structure 110-1 through 110-4. The illustrated example provides two secondary windings wound or otherwise formed around the corresponding core structure 110 in each of the transformer cells 122. In other examples, a single secondary winding can be used in each of the transformer cells 122, or more than two secondary windings can be provided in each secondary circuit. The individual transformer secondary circuits in certain examples also include at least one secondary transistor, for example, a synchronous rectifier transistor connected in series with the corresponding transformer secondary winding between a first converter output 118 and a second converter output 120, or at least one rectifier diode (not shown). In certain examples, the secondary circuits include two windings and a single SR FET or diode structure. In another example, the secondary circuits include one winding and four SR FETs forming a full bridge rectifier structure. In other examples, the individual secondary circuits include one or more secondary windings and one or more rectifier diodes (not shown).

In operation of the system 100, the secondary circuits individually rectify corresponding AC secondary signals (e.g., currents and voltages) to provide a DC output voltage VO at the converter outputs 118 and 120. The converter 100 in one example also includes an output capacitor CO connected between the converter outputs 118 and 120. The individual secondary circuits in the example of FIGS. 1 and 2 include first and second transformer secondary windings wound around at least a portion of a corresponding one of the transformer core structures 110-1, 110-2, 110-3 and 110-4. In this example, the first secondary circuit includes windings S1 and S2, the second transformer secondary circuit includes secondary windings S3 and S4, the third secondary circuit includes secondary windings S5 and S6, and the fourth secondary circuit includes secondary windings S7 and S8. The individual transformer secondary windings include first and second ends. The first ends of the secondary windings are connected to one another at the second converter output 120. The secondary circuits in this example also include first and second secondary transistors and corresponding first and second output capacitors. The first secondary circuit includes transistors SR1 and SR2 operated according to corresponding switching control signals SCS1 and SCS2, as well as cell output capacitors C1 and C2. In this example, the synchronous rectifiers or secondary transistors SR are n-channel FETs individually connected between the corresponding secondary winding and the first converter output 118. Other types of semiconductor-based secondary transistor switches can be used in other examples. The secondary circuit output capacitors are each connected between the first and second converter outputs 118 and 120.

The other example secondary circuits are similarly configured as shown in FIG. 1. The second secondary circuit in this example includes transistors SR3 and SR4 operated according to corresponding switching control signals SCS3 and SCS4, as well as output capacitors C3 and C4. The third secondary circuit in this example includes transistors SR5 and SR6 operated according to corresponding switching control signals SCS5 and SCS6, as well as capacitors C7 and C8. The fourth secondary circuit in this example includes transistors SR7 and SR8 operated according to corresponding switching control signals SCS7 and SCS8, and output capacitors C7 and C8. As with the secondary circuit of the first transformer cell 122-1, the capacitors in the remaining three transformer secondary circuits are individually connected between the first and second converter outputs 118 and 120, and the transistors of the remaining three secondary circuits are individually connected between the second end of the corresponding secondary winding and the first converter output 118.

The power conversion system 100 also includes a control circuit or driver circuit 124. The control circuit 124 includes a first set of outputs 126 which provide the primary side switching control signals SCP1 and SCP2 to alternately turn Q1 and Q2 on and off. This alternately couples the switching node 106 to the input nodes 102, 104 to provide AC signals to the transformer primary windings P1-P4. The control circuit 124 in one example also includes a second set of outputs 128 if the secondary circuit includes one or more transistors. Where secondary side rectifier diodes are instead used, the outputs 128 can be omitted. The outputs 128 in the illustrated example provide a second set of switching control signals SCS1-SCS8 to the secondary transistors SR1-SR8 to rectify AC signals from the secondary circuits to provide the DC output voltage signal VO at the converter outputs 118 and 120. The control circuit 124 can be a single device or can be implemented by two or more controller chips or controller circuits. The first and second sets of switching control signals SCP, SCS are synchronized in certain examples. The control circuit 124 in certain examples operates in closed loop fashion to regulate the output voltage signal VO according to one or more feedback signals and a desired output signal or set point. In the example of FIG. 1, the control circuit 124 receives an output voltage feedback signal VO (e.g., from the second converter output 120 relative to a reference voltage or ground voltage at the first converter output 118), and also receives an output current feedback signal IO. The example of FIG. 1 includes a current sensor associated with the first output node 118 to provide the output current feedback signal 10. This example uses low side output current sensing. Different sensing configurations and feedback circuitry can be used in other examples.

FIG. 2 shows the core stack structure 130 that provides an integrated magnetic circuit with five E-shaped transformer and inductor core structures 110-1 through 110-5, as well as a generally planar top core structure 110-T above the first transformer core structure 110-1. The integrated magnetic circuit in this example includes the four transformer cells for transformer coupling and a bottom cell for the resonant inductor of the LLC resonant converter 100. The cells in one example are mechanically mounted in the stack structure 130 using adhesive (not shown). For instance, the transformer and inductor cells can be glued together, with or without gaps between the adjacent core structures 110. Mechanical mounting structures can be used in other examples (not shown). The individual core structures 110 can be positioned in contact with one or more adjacent core structures 110. In the illustrated example, the inductor and transformer core structures 110 are spaced from one another in the core stack structure 130 to provide one or more gaps G between each inductor and transformer core structure and the adjacent transformer or top core structure. In other examples, some of the core structures 110 can be spaced to provide gaps G while others are in contact with one or more adjacent core structures 110.

The transformer and inductor windings can be any suitable conductive structures that are wound or otherwise extend around core structures in order to provide transformer operation and to create the resonant inductor LR. The illustrated example is a vertical stack structure, with the transformer core 110-5 on the bottom, where each E-shaped core structure 110 faces upward along the illustrated vertical or Y-direction. The transformer primary and secondary windings P1-P4, S1-S8 in FIG. 2 are formed as conductive structures, such as traces that extend around the transformer core structure 110-1, 110-2, 110-3, 110-4 on or in a transformer cell printed circuit board (PCB) of the corresponding transformer cell. In addition, the inductor winding LW in this example is a conductive structure that extends around the inductor core structure 110-5 on or in an inductor cell PCB. The conductive structures of a given cell can be formed on a single corresponding multi-layer PCB, for example, with different layers for the different windings. The number and nature of the conductive structures can be tailored to provide any desired primary-to-secondary transformer turns ratio, and the conductive structures forming the windings can be sized to support any desired level of primary and secondary circuit current flow for a given end-use application.

In the example of FIG. 2, the individual conductive structures for the transformer and inductor cells are formed as a single conductor trace that covers a substantial portion of a given layer of the PCB structure and extends at least partially around a center leg of the corresponding E-shaped core structure. This facilitates support for high current levels with reduced winding loss. For the transformer cells, a primary winding and two secondary windings (e.g., P1, S1 and S2 for the first transformer cell 122-1) can be formed as traces or other conductive structures on different layers of a single PCB. In one example, the secondary windings are formed on the top and bottom layers, and the primary winding is formed in one or more intermediate layers, although not a requirement of all possible implementations. In other examples, insulated wires can be used to form the transformer and/or inductor windings in the stack structure 130. In further examples, the transformer and/or inductor windings can be formed as conductive structures on individual PCB structures, with multiple PCBs provided in a given one of the transformer and/or inductor cells. In the illustrated example, the PCB structures for the transformer and inductor cells are generally rectangular, and include a center opening to accommodate the center leg of the corresponding E-shaped core structure 110, although not a requirement of all possible implementations.

The use of PCB structures in FIG. 2 also allows compact integration of further circuit components in the stack structure 130. In this example, the secondary transistors SR1-SR8 and the secondary capacitors C1-C8 are mounted on the transformer cell PCB of the corresponding transformer cells. This arrangement allows normal printed circuit board component mounting techniques and circuit board trace interconnections to connect the secondary transistors in series with the corresponding transformer secondary winding. Suitable connectors can be mounted to the cell circuit boards (not shown in FIG. 2) to provide external connection from the secondary circuitry to the converter outputs 118 and 120, as well as to facilitate connection for any included output capacitor C0 and/or output current and output voltage sensing components (not shown in FIG. 2). In the example of FIG. 2, moreover, the capacitor and secondary transistor components are mounted on the top and bottom sides of the multi-layer PCB structure in order to accommodate connection to the corresponding conductive structure forming the corresponding upper or lower secondary winding, with the secondary circuitry provided on the top and bottom layers of a multi-layer PCB structure and the transformer cells. As further shown in the example of FIG. 2, the inductor cell includes a PCB structure with one or more layers, including one or more conductive structures forming the inductor winding LW around the center leg of the corresponding E-shaped inductor core 110-5. In this example, the resonant circuit capacitor CR is mounted to a top side of the inductor cell PCB structure.

Figure 3:
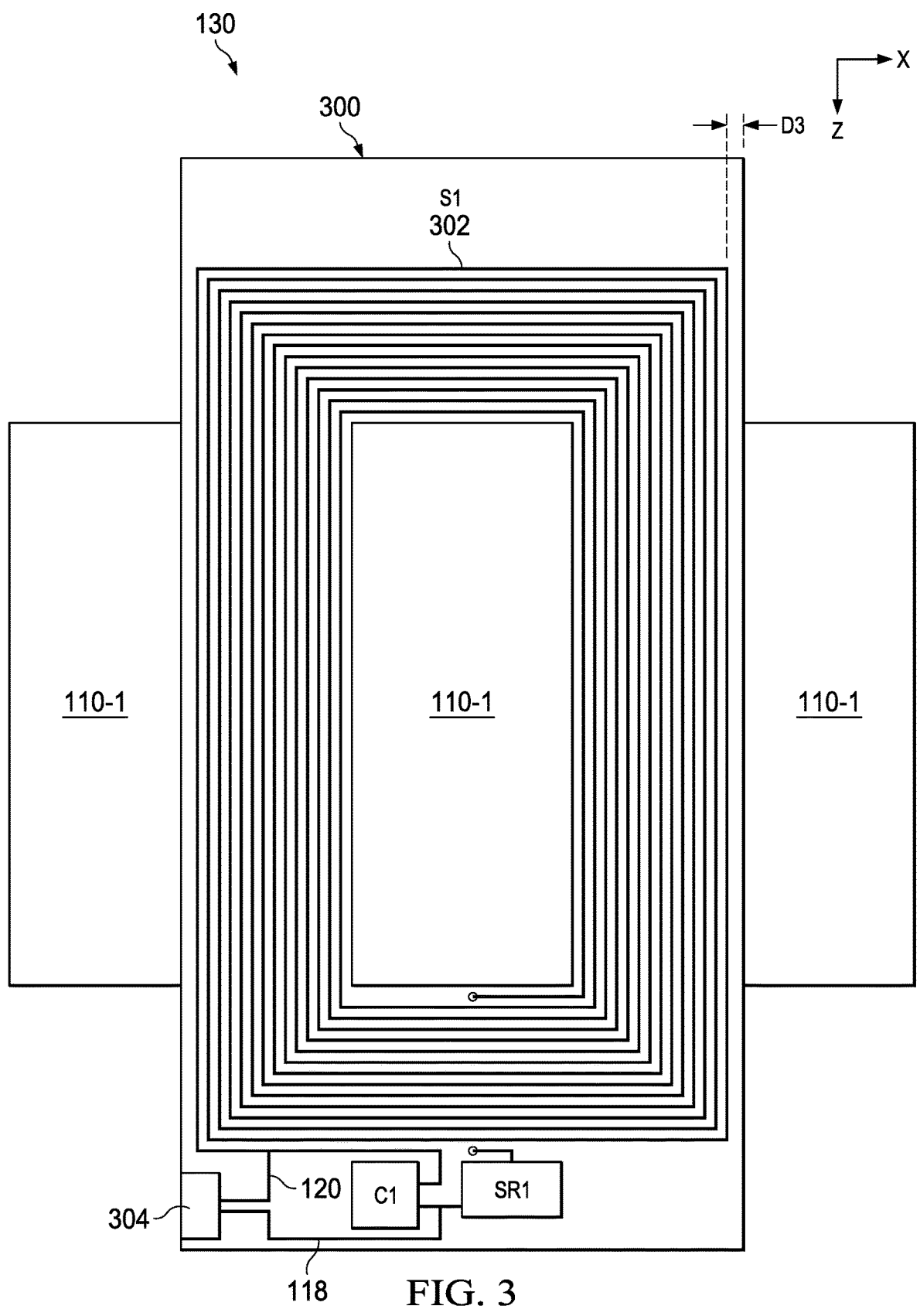
FIG. 3 is a top plan view of a secondary winding formed as conductive structures on or in a printed circuit board that extend around a center leg of an example transformer core structure.
Figure 4:
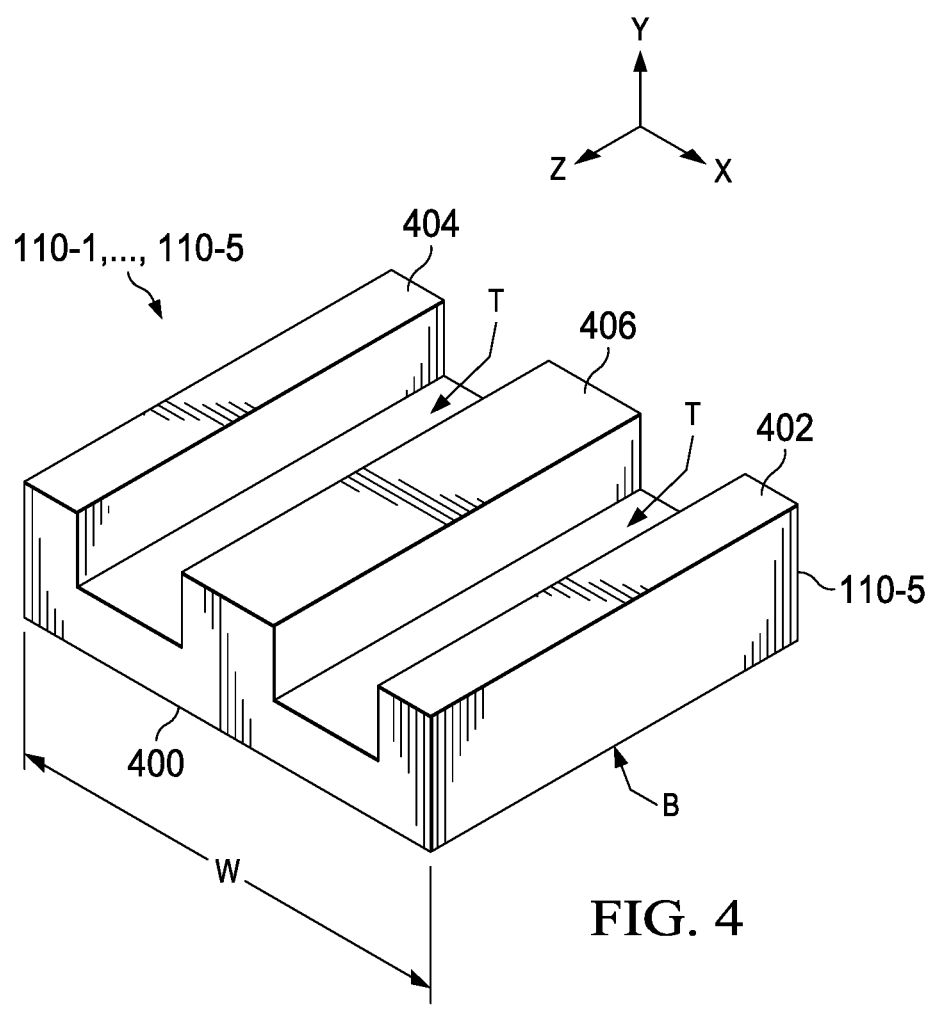
FIG. 4 is a perspective view of an example E-shaped transformer core structure.

Referring also to FIGS. 3 and 4, FIG. 3 shows a top view of an example secondary winding S1 formed as a multi-turn conductive structure or trace 302 on or in a printed circuit board 300 that extend around a center leg of a transformer core structure. In this example, the upper secondary winding conductor trace 302 for the winding S1 is located on the top layer of the corresponding PCB structure 300. As shown in FIG. 2, moreover, the corresponding secondary capacitor C1 and synchronous rectifier secondary switch SR1 are mounted on the same top side of the PCB structure 300 shown in FIG. 3. The PCB includes corresponding traces to connect the secondary winding S1, the capacitor C1 and the secondary switch SR1 to one another and to provide connections to the converter outputs 118 and 120 via a connector 304. The connector 304 can be a component mounted to the PCB 300, or can be fingers or traces for interfacing with an edge connector, or any suitable interconnection can be provided to make the connections to the converter outputs 118 and 120. The PCB 300 can include multiple layers as well as vias or other intra-layer interconnect structures to provide electrical connection as needed, for example, to allow the use of multiple internal layers to provide a multi-turn primary winding. As further shown in FIG. 3, moreover, the upper secondary winding S1 is laterally spaced from the end and center legs of the first transformer core structure 110-1 by a distance D3. In one example, the PCB structure 300 includes multiple layers to accommodate uppermost and lowermost secondary windings and corresponding secondary circuit components, as well one or more intermediate layers to accommodate conductive structures to form the primary windings. In certain examples, the conductive structures on a given layer on or in the PCB structure 300 can be multiple-turn configurations, for example, as seen in FIGS. 3 and 7-10. In certain examples, moreover, the conductive structures can be a single-turn configuration on or in a given PCB layer (e.g., FIGS. 11-160), and in one example the single-turn conductive structures on a given layer have a suitable lateral spacing (e.g., D3) from the corresponding core structure 110 in the X direction.

FIG. 4 shows an example E-shaped transformer core structure 110 that can be used for the transformer or inductor core structures 110-1 through 110-5 in the core stack structure 130. The core structure 110 can be made of iron or other ferrous material suitable for providing a transformer or inductor core. The core structure 110 in certain examples is a solid structure. In certain implementations, a laminated core structure 110 is used. The core structure 110 includes a base 400 that extends along a lateral width W in the X direction from a first end to a second end. The base 400 includes a top side T and an opposite bottom side B. The E-shaped core structure includes end legs 402 and 404 as well as a center leg 406. A first end leg 402 extends outward from the top side T of the base 400 proximate the first end in the Y direction (e.g., vertically upward from the base 400). A second end leg 404 extends outward from the top side T proximate the second end in the Y direction. The middle leg 406 is spaced from and between the first and second end legs 402, 404 along the X direction, and extends outward from the top side T in the Y direction. The lateral spacing of the center leg 406 from the end legs 402 and 406 provides two spaces in which the transformer or inductor windings can be wound at least partially around the center leg 406. As used herein, the term wound means extension of a wire, conductive PBC trace or other conductive structure constituting a transformer or inductor winding, at least partially around at least a portion of a core structure 110 to provide magnetic coupling to implement an electrical inductance and/or to implement transformer coupling between a primary winding and a secondary winding.

In the example of FIGS. 1 and 2, the inductor winding LW is wound around the middle leg 406 of the inductor core structure 110-5, and the individual transformer primary and secondary windings P1-P4 and S1-S8 are wound around the middle leg 406 of the corresponding transformer core structure 110-1, 110-2, 110-3 and 110-4. In the illustrated vertical stacking of generally planar core structures, the end and middle legs 402, 404, 406 of the inductor core structure 110-5 and the lower three transformer core structures 110-1, 110-2 and 110-3 face the base 400 of an adjacent transformer core structure 110-1, 110-2, 110-3, 110-4, and the top core structure 110-T includes a lower side that faces the end and middle legs 402, 404, 406 of the first transformer core structure 110-1. Other examples can include any integer number N transformer cells, where N is greater than 1. Other shapes and configurations of core structures 110 can be used in other implementations.

Figure 5:
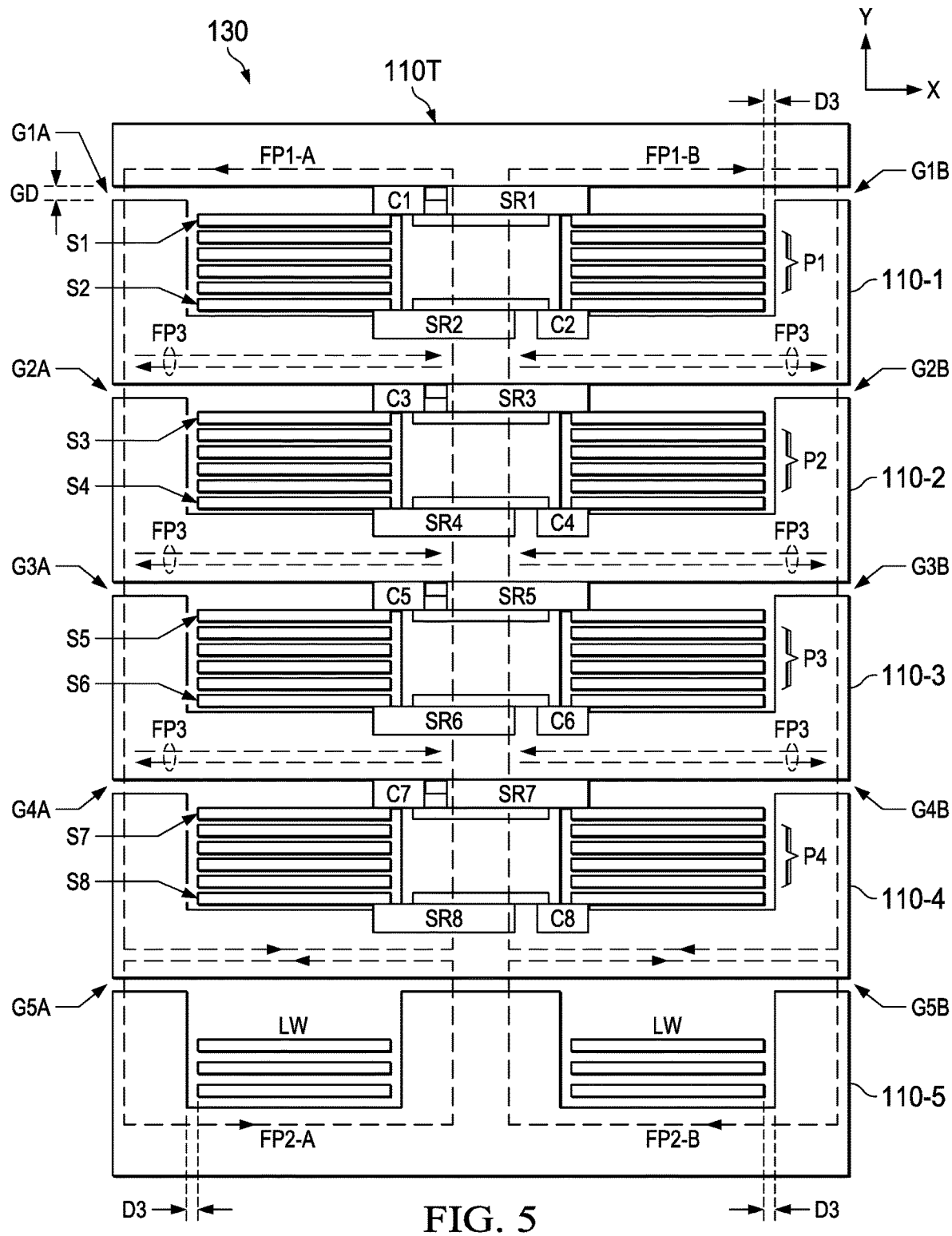
FIG. 5 is a front elevation view of the example integrated transformer stack structure with gaps between adjacent cell core structures showing flux cancellation.
Figure 6:
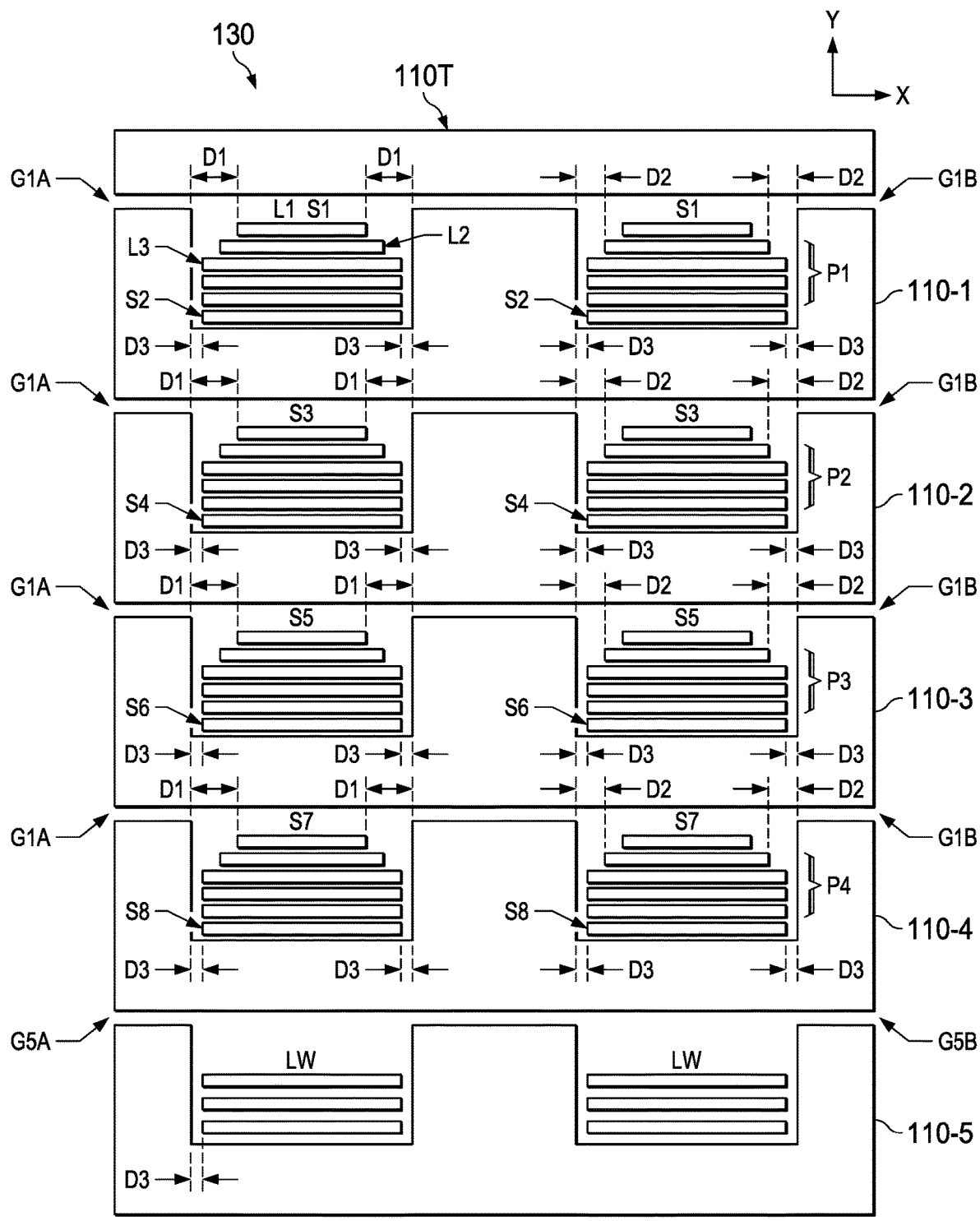
FIG. 6 is a front elevation view of another example integrated transformer stack structure with shaped windings.

FIG. 5 shows a front view of the integrated transformer stack structure 130 with gaps G between adjacent cell core structures. The stacked configuration includes gaps G1A and G1B between the top core structure 110-T and the end legs of the first transformer core structure 110-1. In this example, the gaps G1A and G1B are substantially equal, although not a requirement of all possible implementations. A similar gap (not labeled) is provided between the top core structure 110-T and the center leg of the transformer core structure 110-1, although not a requirement of all possible implementations. The other gaps between the other adjacent core structures are similar in this example, including gaps G2A and G2B between the first and second transformer core structures 110-1 and 110-2, gaps G3A and G3B between the second and third transformer core structures 110-2 and 110-3, gaps G4A and G4B between the third and fourth transformer core structures 110-3 and 110-4, and gaps G5A and G5B between the fourth transformer core structure 110-4 and the inductor core structure 110-5. In certain examples, the inductor-transformer gap(s) G5 can be different than the transformer-transformer gap(s).

FIG. 5 also shows flux cancellation in the integrated magnetic circuit created by the stacked core structure. The transformer and inductor windings are oriented and configured to provide flux paths as illustrated in FIG. 5 to facilitate flux cancelling performance through integration of the core structures 110 in the core stack structure 130. The sub stack of transformer core structures 110-1 through 110-4 provide additive transformer coupling flux illustrated as left and right side flux paths FP1-A and FP1-B. FIG. 5 also shows flux paths FP2-A and FP2-B in the E-shaped transformer core structure 110-5 and the base of the fourth transformer core structure 110-4. The flux in the four transformer cells are the same and the flux is fully cancelled along intra-cell cross paths FP3 between each transformer cell. The stacked core structure facilitates flux cancellation between each cell and significantly reduces the core loss to enhance thermal and electrical efficiency and high power density. The symmetric structure of each cell also helps the current balancing of secondary parallel winding pairs of each transformer cell, which combine to provide the output current to drive a connected load (not shown). The flux paths shown in FIG. 5 facilitate low-loss transformer coupling of the primary and secondary circuits in the integrated magnetic circuit. The resonant inductor LR and the transformer windings thus share the magnetic circuit via the integrated stack structure 130. The stacked structure 130 provides a low reluctance path through the high permeability core structure material. The flux generated from the resonant inductor LR and the transformer flows in the low reluctance path rather than the high reluctance path with air gaps. The resonant inductor LR and the transformer will not magnetically couple with each other. The flux of resonant inductor can change with the primary current and the flux between transformer and resonant inductor can also be partially cancelled.

Referring also to FIGS. 6-10, FIG. 6 shows a front view of another integrated transformer stack structure with shaped windings to further enhance efficiency by reducing fringing losses. The individual transformer primary windings P1-P4 and transformer secondary windings S1-S8 are stacked or otherwise positioned in spaces between the middle leg 406 and end legs 402, 404 of each individual transformer core structure 110-1, 110-2, 110-3 and 110-4. The inductor winding LW extends in the spaces between the middle leg 406 and end legs 402, 404 of the inductor core structure 110-5. In the example of FIG. 5 above, the laterally outward edges of the conductive structures that form the transformer and inductor windings nearest the core structure outer legs are spaced therefrom by a distance D3. The example in FIG. 6 includes shaped transformer windings near the end leg core structure gaps G to reduce fringing losses. In the illustrated example, the uppermost winding of the transformer windings is positioned farthest from the base 400 of the individual transformer cells, and the uppermost winding in this example is the secondary winding S1, S3, S5, S7. The uppermost windings S1, S3, S5 and S7 are laterally spaced from the end legs 402, 404 by a distance D1.

Figure 7:
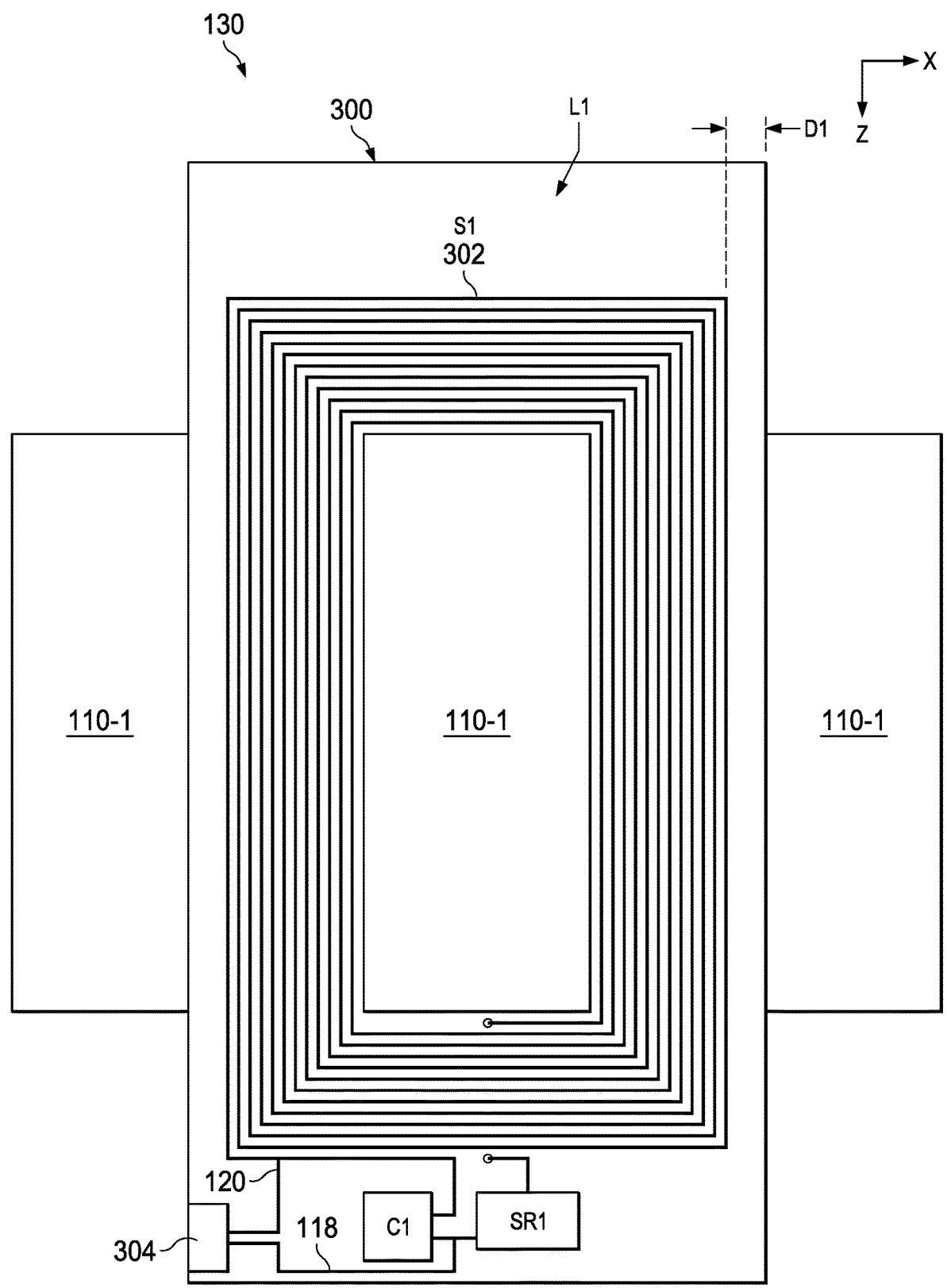
FIG. 7 is a top plan view of an uppermost secondary winding formed as conductive structures on a top layer of a printed circuit board, spaced from an outer leg of the example core structure by a first distance.
Figure 8:
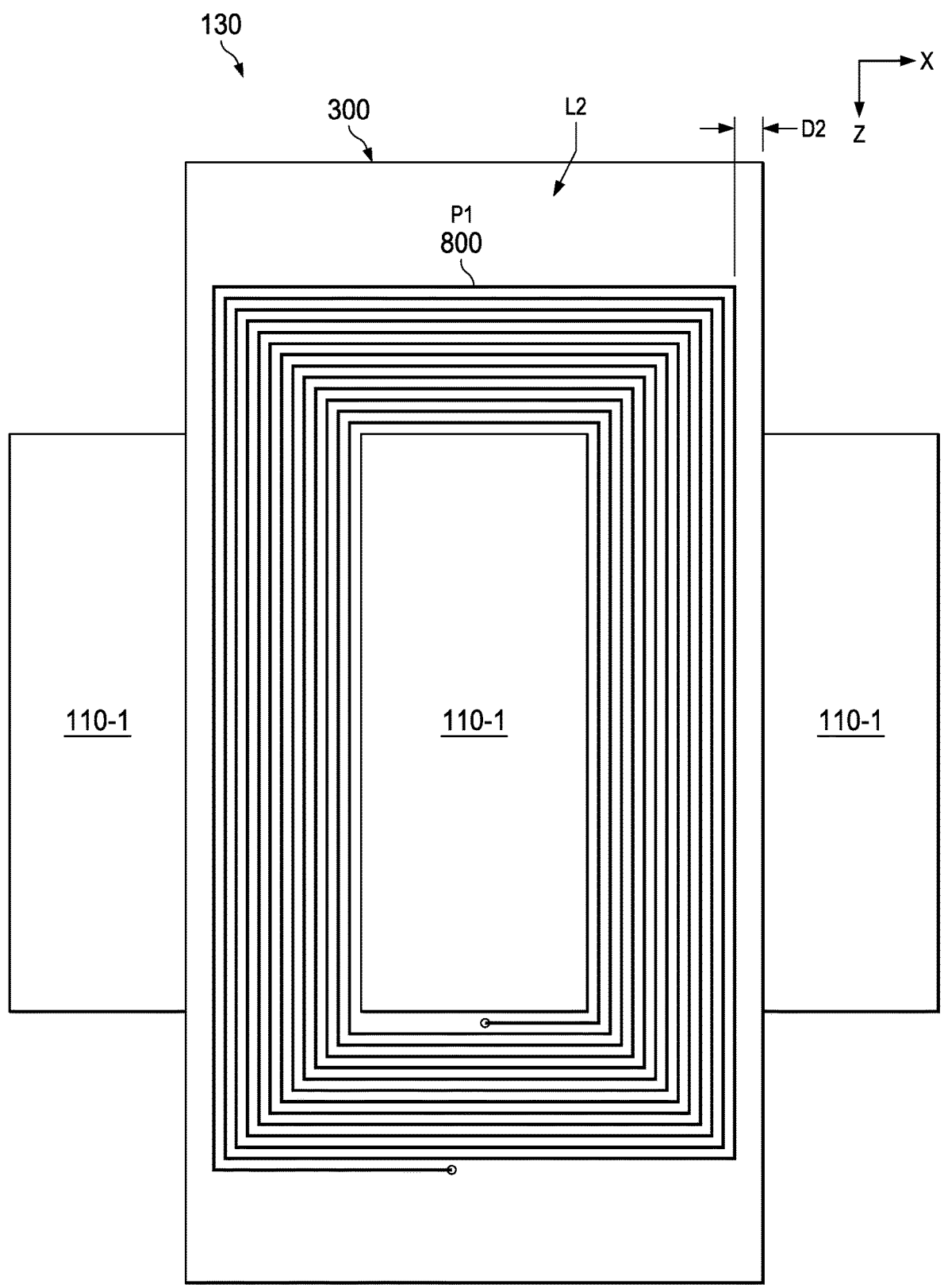
FIG. 8 is a top plan view of a primary winding formed as conductive structures in a lower second layer of the printed circuit board, spaced from the outer leg of the example core structure by a smaller second distance.
Figure 9:
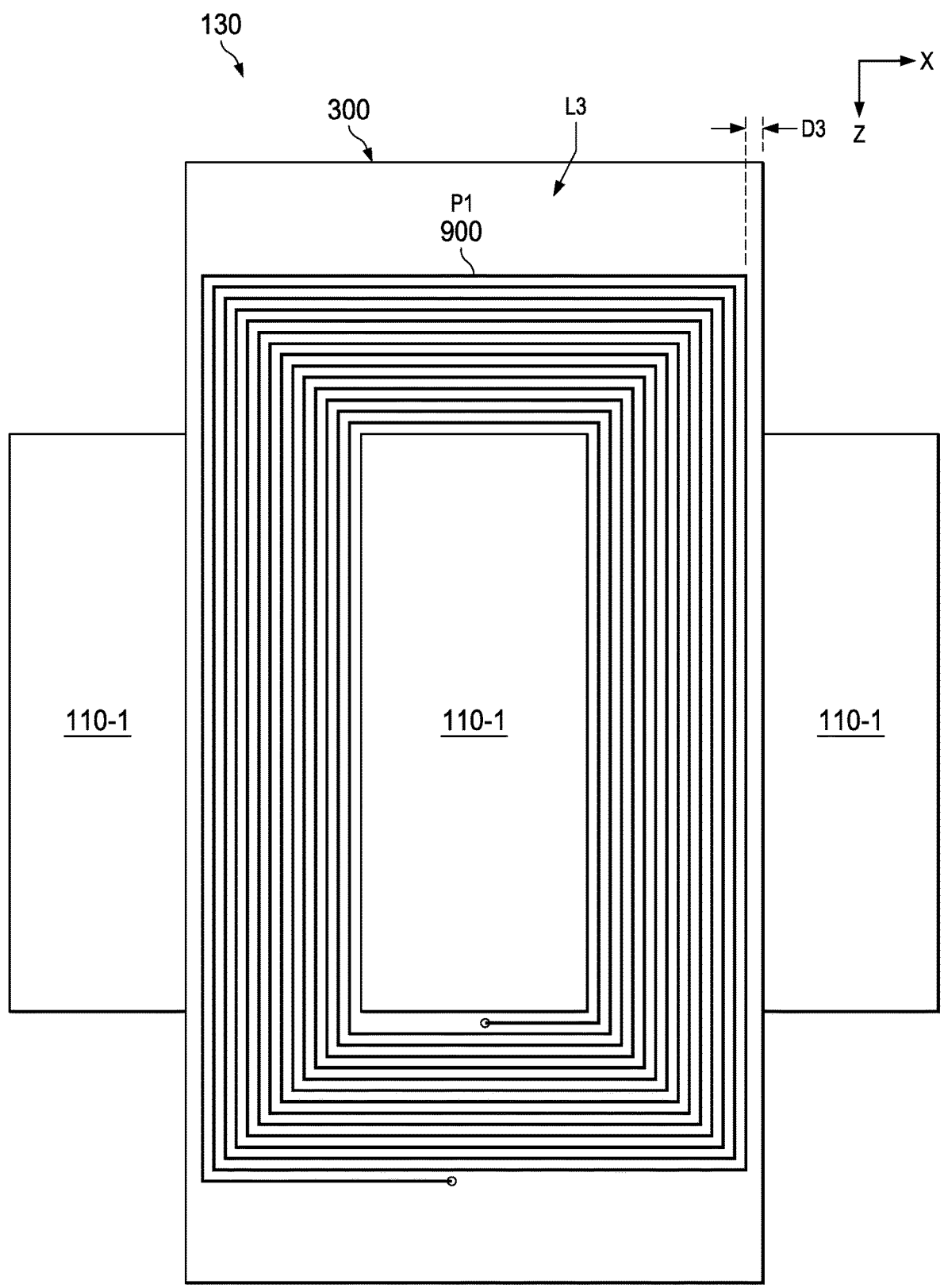
FIG. 9 is a top plan view of a primary winding formed as conductive structures in a lower third layer of the printed circuit board, spaced from the outer leg of the core structure by a smaller third distance.

FIG. 7 shows a top view of an uppermost secondary winding S1 formed as a multi-turn conductive structure 302 on a top layer L1 of an associated mutli-layer PCB 300 around the center leg of the transformer core structure 110-1. The conductive structure 302 is spaced from the outer legs of the core structure 110-1 by a first distance D1 that is larger than the distance D3 in FIG. 6. FIG. 8 shows a top view of a primary winding P1 formed as conductive structure 800 in a lower second PCB layer L2 under the layer L1. This winding P1 is the second highest winding in the first transformer cell, and is spaced from the outer leg of the core structure 110-1 by a smaller second distance D2 (D2<D1). FIG. 9 shows a conductive structure 900 in a lower third layer L3 of the transformer cell PCB 300, including a continuation of the primary winding P1. This conductive structure 900 is spaced from the outer leg of the core structure 110-1 by the still smaller third distance D3, where D1>D2>D3.

Figure 10:
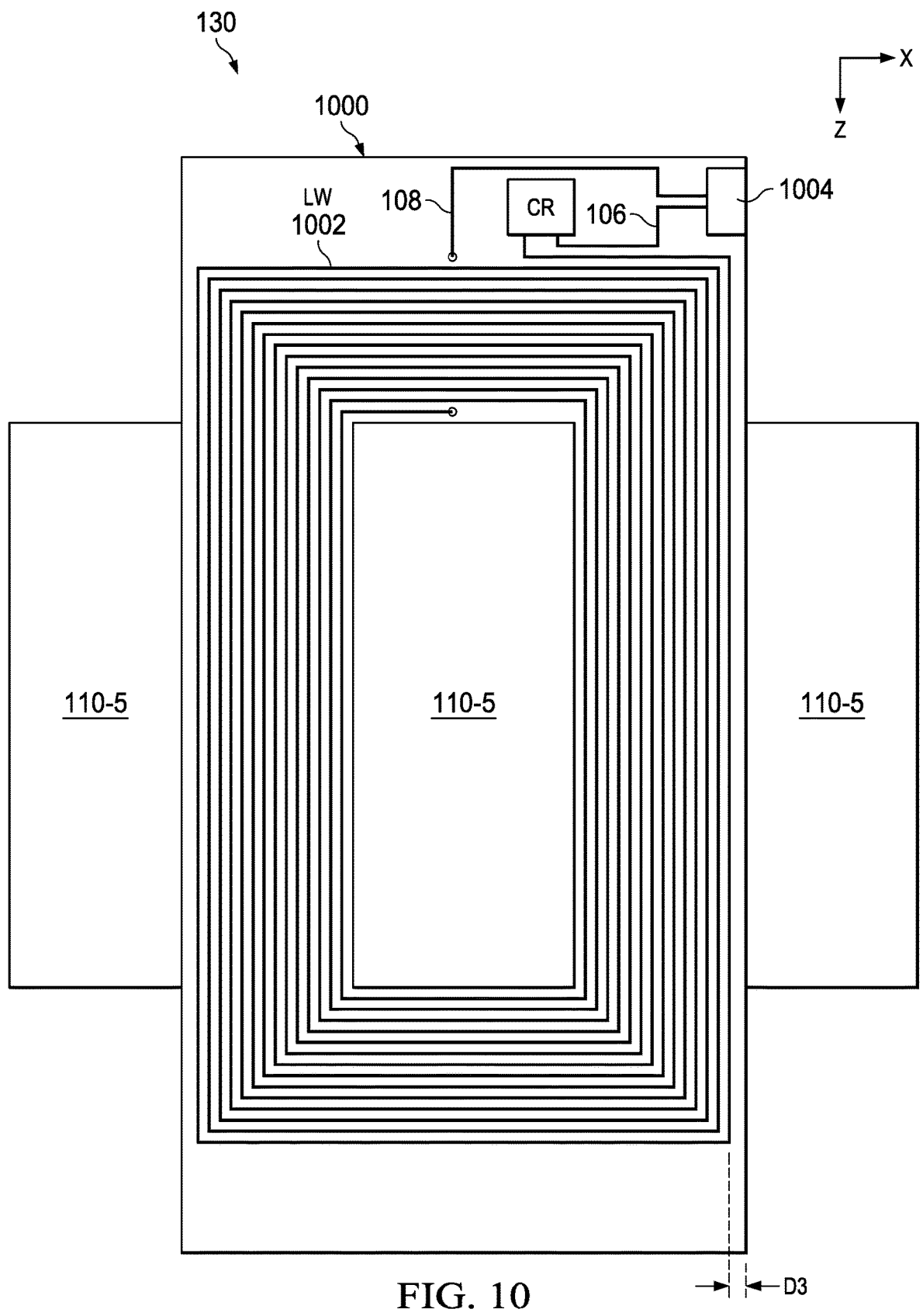
FIG. 10 is a top plan view of an inductor winding formed as conductive structures or on a printed circuit board, spaced from the outer leg of the core structure by the third distance.

In one example (e.g., FIG. 6), the inductor windings LR are all laterally spaced from the inductor core center leg by the smaller distance D3, although not a requirement of all implementations. FIG. 10 shows a top view of this configuration in which the inductor winding LW is formed as one or more conductive structures 1002 on or in an inductor cell PCB 1000. The inductor winding structure 1002 in this example is spaced from the outer leg of the inductor core structure 110-5 by the third distance D3. As further shown in FIG. 10, the resonant capacitor CR is mounted on the PCB structure 1000 and the inductor PCB 1000 includes traces to interconnect the resonant inductor and the capacitor CR in series between the node 108 and the switching node 106 (FIG. 1). The inductor PCB 100 in one example also includes a connector 1004 to facilitate coupling with the switching circuit 132 and the transformer primary windings P1 and P2 of the first transformer cell 122-1 (node 108 in FIG. 1 above).

In FIGS. 6-10, multi-turn conductive trace patterns are shaped by removing one or more outer turns. In other examples, a single turn is provided on each individual PCB layer, and one or more uppermost windings can be shaped or notched by removing copper from the region near the air-gap in the core to reduce fringing loss caused by the air gap in the core stack structure 130. In this design, the top two layers of the transformer windings closest to air gap are shaped, although not a requirement of all possible implementations of the winding shaping concepts described herein. Reducing or shaping the winding near the air gap G reduces the fringing loss, but may increase the winding conduction losses. The shaped windings can be tailored to balance the tradeoff between fringing loss and AC conduction loss in the shaped winding or windings to facilitate lowered total winding and fringing losses.

Figure 11:
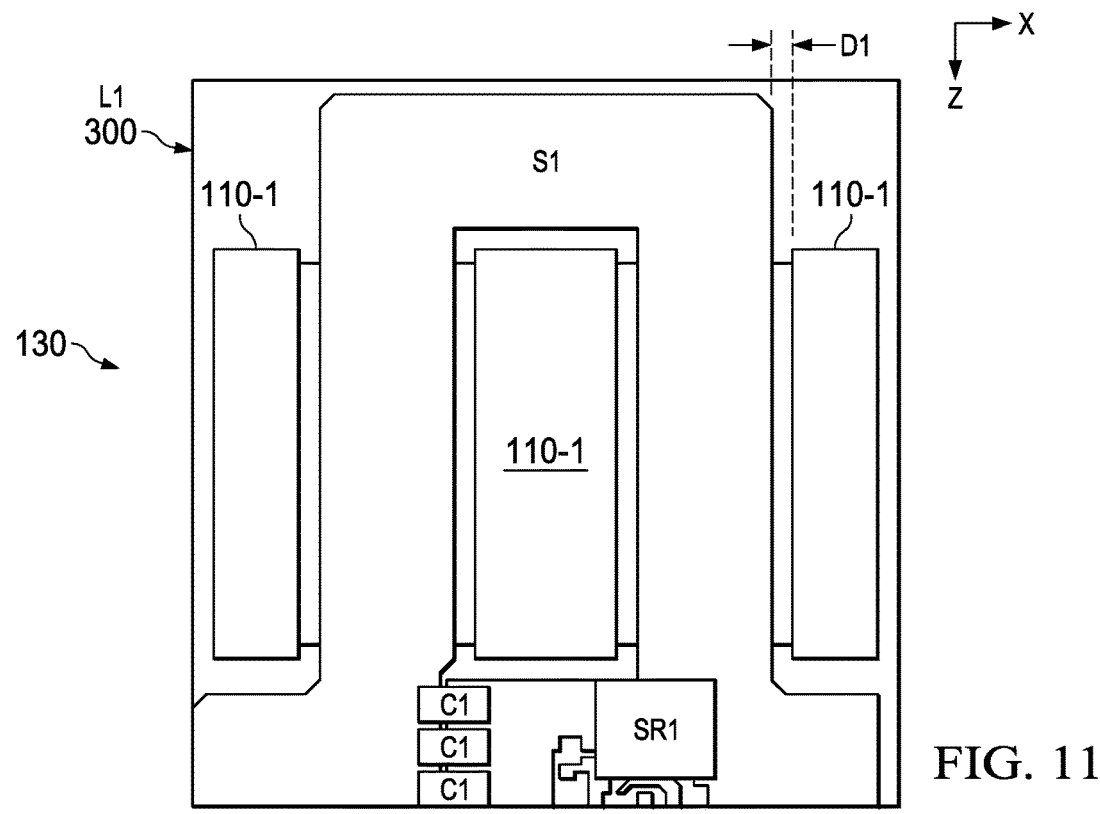
FIG. 11 is a top plan view of an uppermost secondary winding formed as a single wide trace conductive structure on a top layer of a multi-layer printed circuit board, spaced from an outer leg of the example core structure by a first distance.
Figure 12:
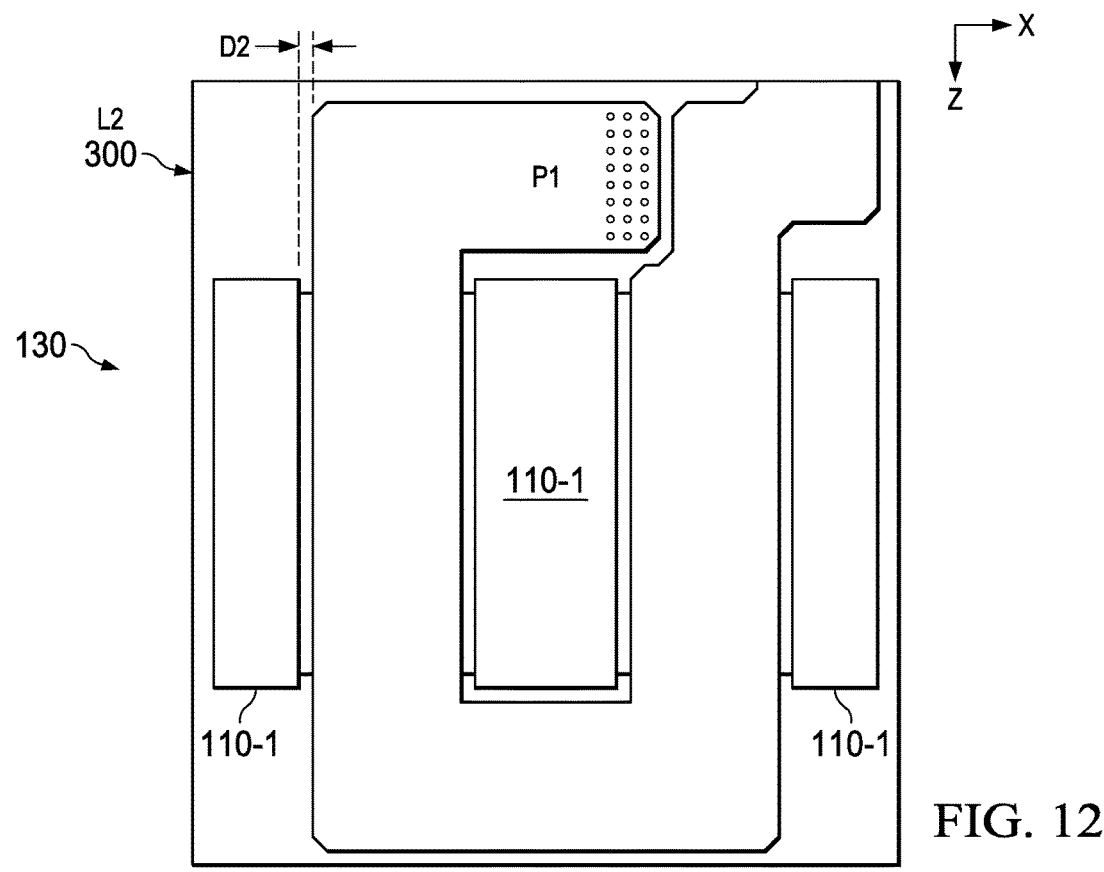
FIG. 12 is a top plan view of a first portion of a primary winding formed as a single wide trace conductive structure in a lower second layer of the multi-layer printed circuit board, spaced from the outer leg of the example core structure by a smaller second distance.
Figure 13:
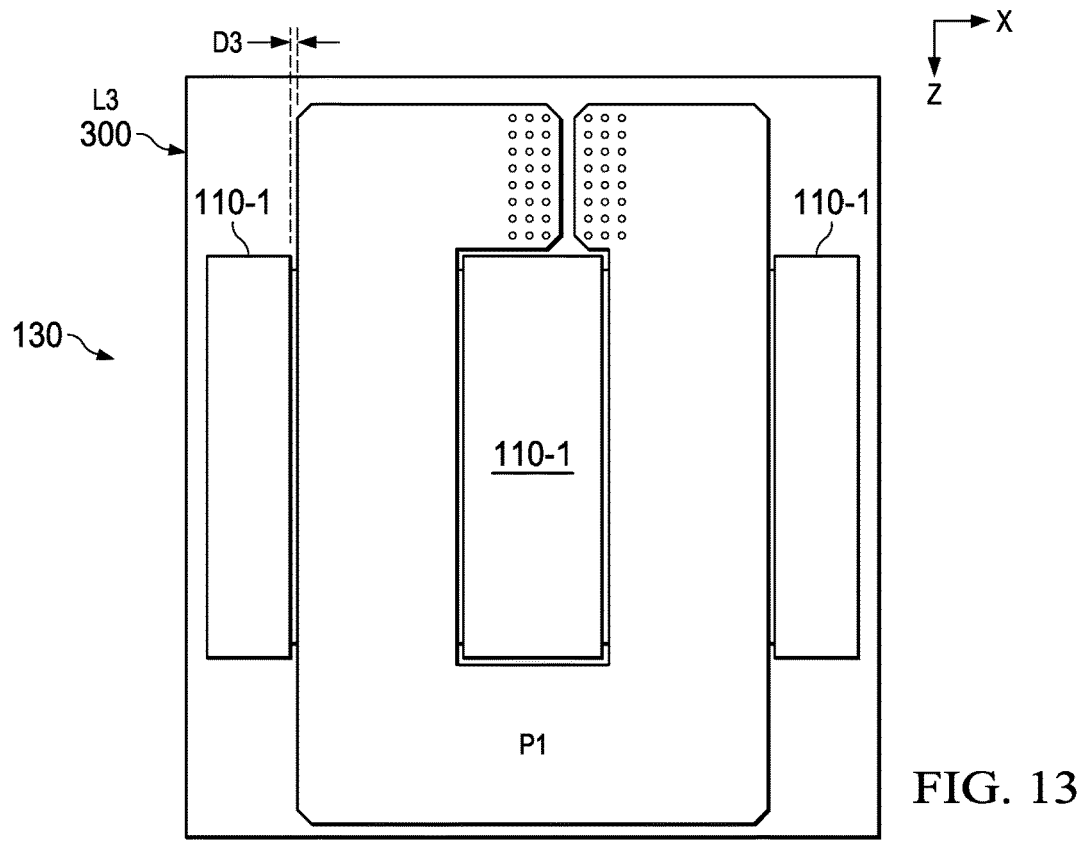
FIG. 13 is a top plan view of a second portion of the primary winding formed as a single wide trace conductive structure in a lower third layer of the multi-layer printed circuit board, spaced from the outer leg of the example core structure by a still smaller third distance.
Figure 14:
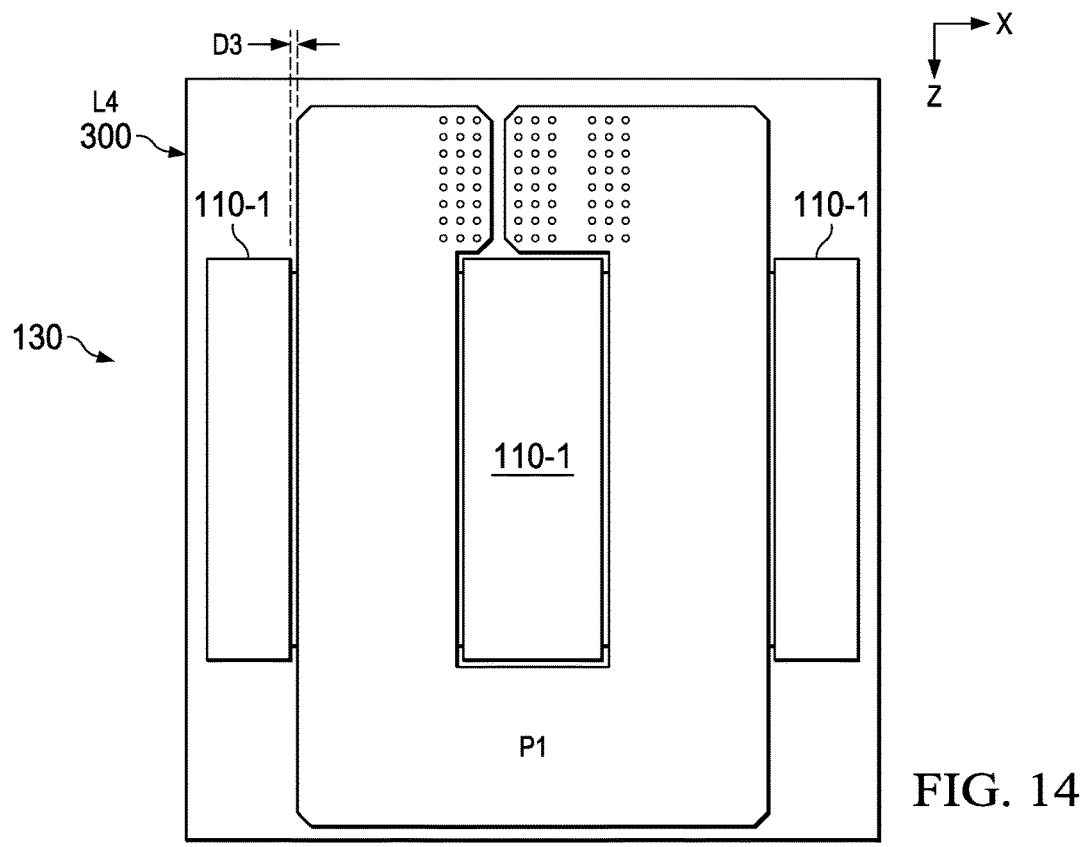
FIG. 14 is a top plan view of a third portion of the primary winding formed as a single wide trace conductive structure in a lower fourth layer of the multi-layer printed circuit board, spaced from the outer leg of the example core structure by the third distance.
Figure 15:
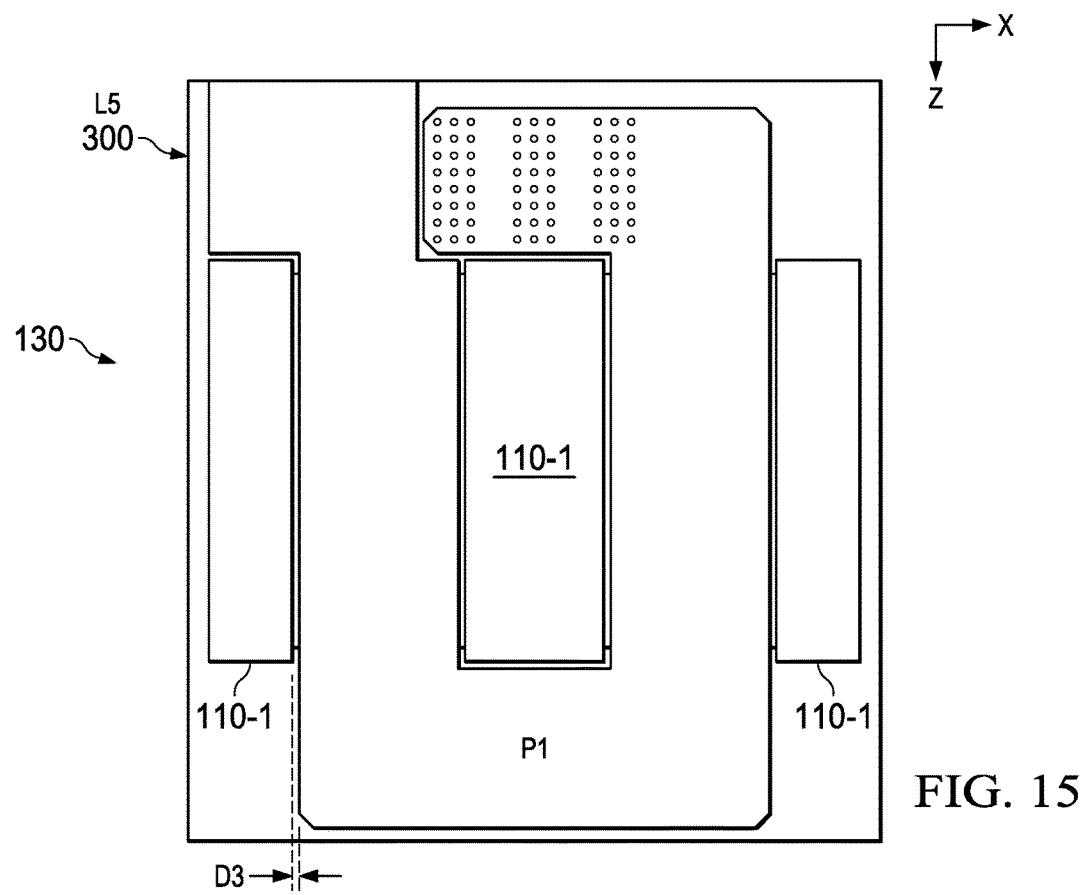
FIG. 15 is a top plan view of a fourth portion of the primary winding formed as a single wide trace conductive structure in a lower fifth layer of the multi-layer printed circuit board, spaced from the outer leg of the example core structure by the third distance.
Figure 16:
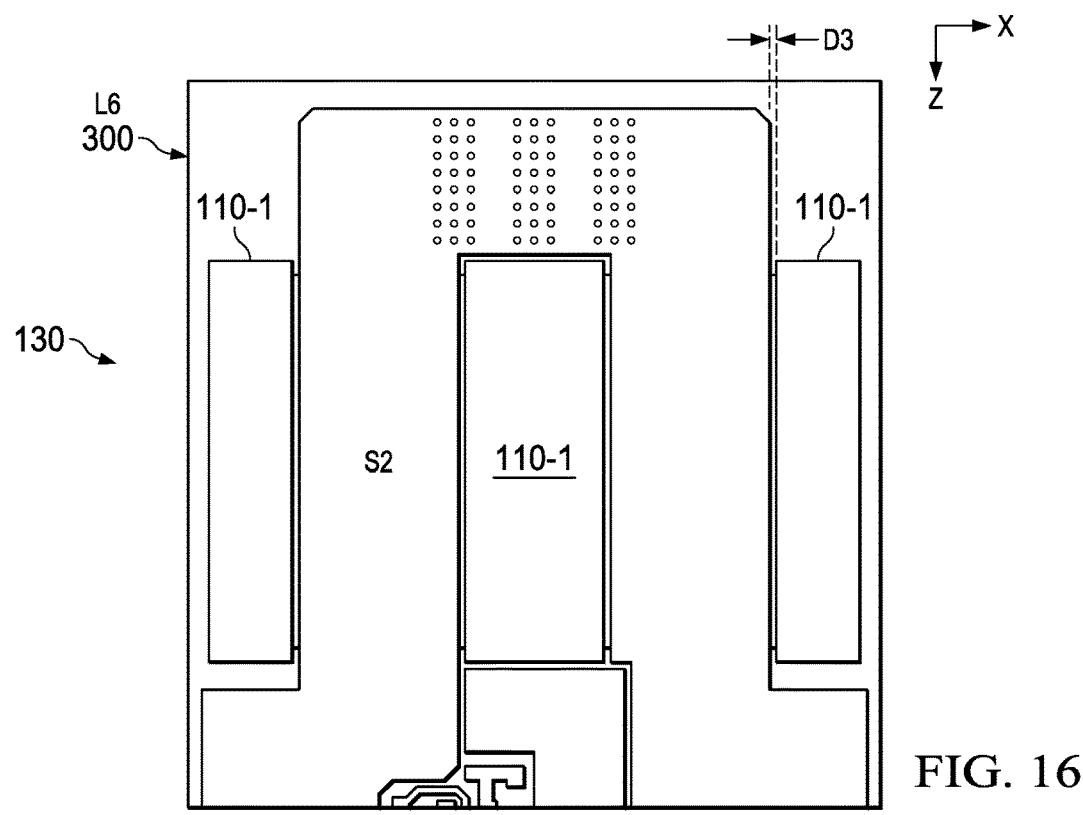
FIG. 16 is a top plan view of a second secondary winding formed as a single wide trace conductive structure in a lower sixth layer of the multi-layer printed circuit board, spaced from the outer leg of the example core structure by the third distance.

Referring now to FIGS. 11-16, The examples of FIGS. 3 and 7-10 include multi-turn conductive trace structures on a given layer of a PCB structure 300. In other implementations, single-turn conductive structures or traces can be formed on a given layer of a multi-layer PCB structure 300. This can be advantageous, for example, to enhance the current carrying capability for a given design. FIG. 11 shows a top view of an uppermost secondary winding S1 formed as a single wide trace conductive structure on a top layer Ly of a multi-layer PCB 300. In this example, shaped winding techniques are used as described above, where the winding S1 is spaced from the outer core leg by a first distance D1. FIG. 12 shows a top view of a first portion of a primary winding P1 formed as a single wide trace conductive structure in a lower second layer L2 of the multi-layer PCB 300. In this example, the second layer trace forming part of the primary winding P1 is spaced from the outer leg of the core structure by a smaller second distance D2. FIG. 13 shows a top view of a second portion of the primary winding P1 formed as a single wide trace conductive structure in a lower third layer L3 of the PCB structure 300, where the third layer trace is spaced from the outer leg of the core structure 110-1 by a still smaller third distance D3. FIG. 14 shows a top view of a third portion of the primary winding P1 formed as a single wide trace conductive structure in a lower fourth layer L4 of the PCB 300, spaced from the outer leg of the core structure by D3. FIG. 15 shows a top view of a fourth portion of the primary winding P1 formed as a single wide trace conductive structure in a lower fifth layer L5 of the multi-layer PCB 300, which is also spaced from the outer leg of the core structure by the third distance D3. FIG. 16 shows a top view of a second secondary winding S2 formed as a single wide trace conductive structure in a lower sixth layer (e.g., the bottom layer) of the multi-layer printed circuit board 300, where the second secondary winding S2 in this example is spaced from the outer leg of the core structure by the distance D3.

Figure 17:
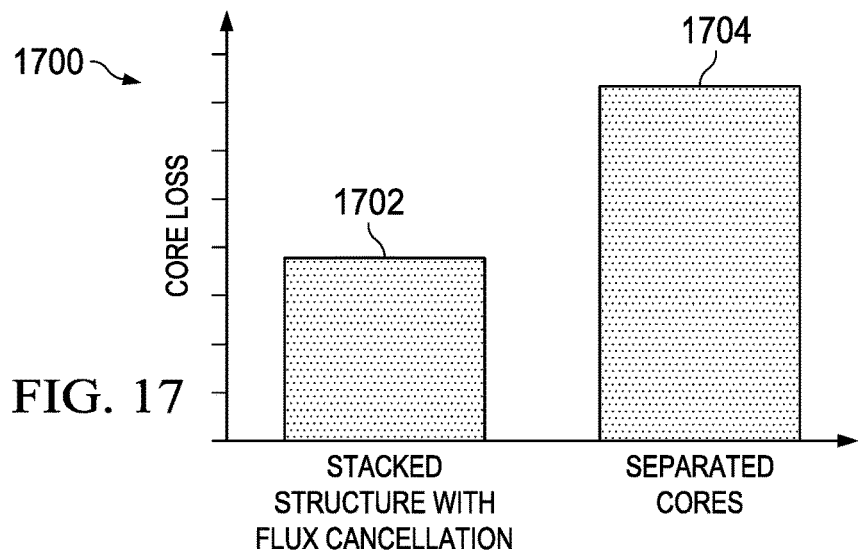
FIG. 17 is an example graph of core loss of the example integrated transformer with stacked cores and a design with separated cores.
Figure 18:
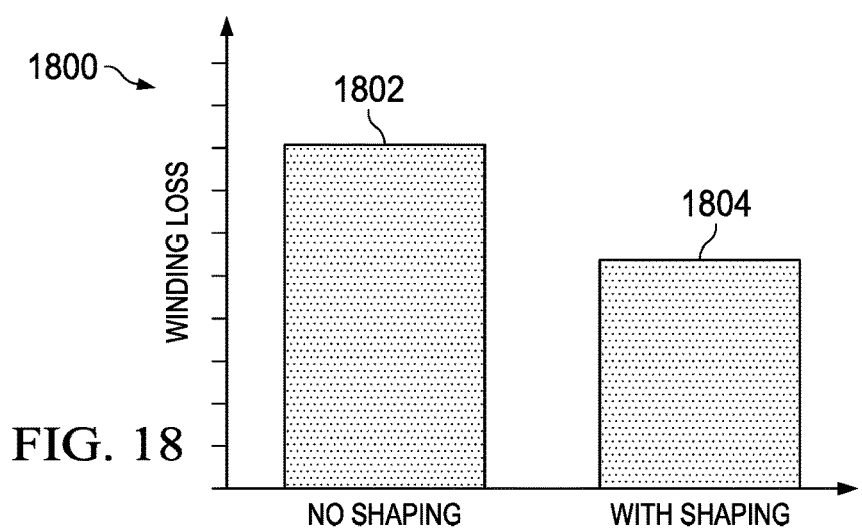
FIG. 18 is an example graph of winding loss of the example LLC transformer winding design with separated cores, and an integrated transformer with stacked cores.
Figure 19:
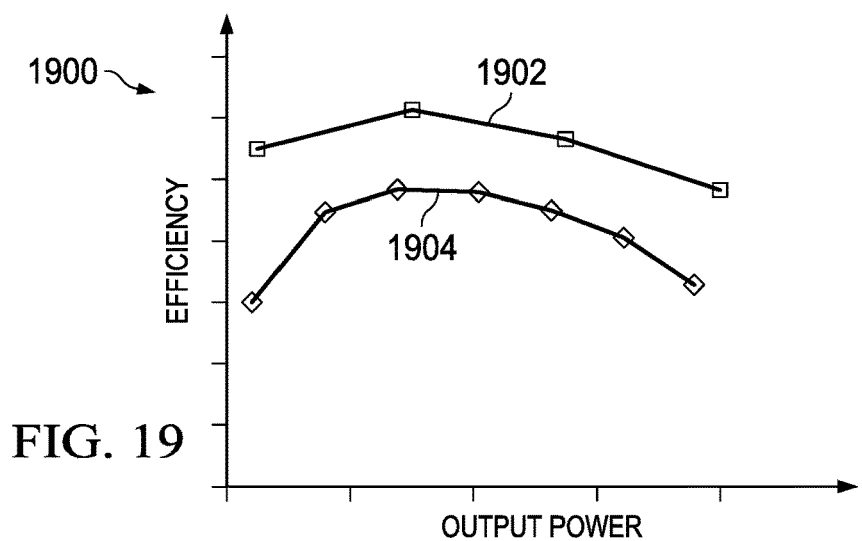
FIG. 19 is an example graph of measured and estimated efficiency for different loads of the example resonant LLC converter with an integrated transformer with stacked cores.

Referring also to FIGS. 17-19, disclosed examples can be employed to facilitate higher converter efficiency and power density, as well as compact power converters. FIG. 17 shows a graph 1700 comparing core loss 1702 of an LLC resonant converter with an integrated transformer with stacked cores (N=4) as described above, and core loss 1704 for an LLC resonant converter design with separated cores. As shown in FIG. 17, the integrated design of the converter 100 can significantly reduce the core loss compared to the design with separate cores for the transformer and resonant inductor. FIG. 18 shows a graph 1800 that compares winding loss 1802 of an integrated LLC transformer winding design without winding shaping to the winding loss 1804 of the above described integrated design using shaped windings as shown in FIGS. 11-16. FIG. 19 shows a graph 1900 that illustrates measured and estimated efficiency curves 1902 and 1904, respectively, for different loads of a resonant LLC converter with an integrated transformer with stacked cores as described above, excluding the power consumption of the control circuit 124 (FIG. 1), where the measured efficiency is lower than the estimated efficiency because a third quadrant operation dead time of the primary side GaN FETs Q1 and Q2 and the diode conduction time of the secondary SR switches were not fully optimized.

Disclosed integrated transformer magnetic circuits and converters 100 facilitate compact LLC resonant converter structures including the transformer, resonant inductor, SR MOSFETs and output capacitor CO. Using GaN FETs for the primary side switches Q1 and Q2 further reduces the gate driver loss and turn-off loss, and the novel integrated transformer with stacked planar core structures, shaped windings and synchronous rectifier MOSFETs reduces the core loss and winding loss. Disclosed example provide advantageous solutions for high performance server and telecommunication applications that require high efficiency and high power density, along with the zero voltage switching and zero current switching advantages of LLC resonant converters. The disclosed examples help facilitate higher frequency operation to reduce the magnetic component sizes and increase power density, while using the integrated magnetic circuits to combat magnetic components losses at higher switching frequencies. The further use of GaN or other wide band primary transistors Q1 and Q2 reduces the switching losses to further facilitate high frequency operation in compact, efficient converters.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. A power conversion apparatus comprising:
a first primary circuit including a first primary winding;
a second primary circuit including a second primary winding coupled in series with the first primary winding;
an inductor including an inductor winding coupled in series with the first and second primary windings;
a first secondary circuit adapted to be magnetically coupled to the first primary circuit, and including first and second secondary windings coupled in series;
a second secondary circuit adapted to be magnetically coupled to the second primary circuit, and including third and fourth secondary windings coupled in series; and
a magnetic core structure including:
a first cell structure including a first center leg around which the first primary winding and the first and second secondary windings are coiled;
a second cell structure including a second center leg around which the second primary winding and the third and fourth secondary windings are coiled, wherein the second cell structure is stacked relative to the first cell structure, in which the second center leg is aligned with the first center leg along an axis; and
a third cell structure including a third center leg around which the inductor winding is coiled, the third cell structure stacked relative to the first and second cell structures, in which the third center leg is aligned with the first and second center legs along the axis.

2. The power conversion apparatus of claim 1, wherein the magnetic core structure includes:
a first trench receiving the first primary winding and the first and second secondary windings; and
a second trench receiving the second primary winding and the third and fourth secondary windings, the second trench aligned with the first trench along the axis.

3. The power conversion apparatus of claim 2, wherein the magnetic core structure includes:
a third trench receiving the inductor winding, and aligned with the first and second trenches along the axis.

4. The power conversion apparatus of claim 1, further comprising:
a switching circuit; and
a capacitor coupled between the switching circuit and the inductor.

5. The power conversion apparatus of claim 4, wherein the switching circuit includes:
a first gallium nitride (GaN) transistor;
a second GaN transistor coupled between in series with the first GaN transistor, wherein the capacitor is coupled to respective first terminals of the first and second GaN transistors; and
an input capacitor coupled between respective second terminals of the first and second GaN transistors.

6. A power conversion apparatus comprising:
a first primary circuit including a first primary winding;
a second primary circuit including a second primary winding coupled in series with the first primary winding;
an inductor including an inductor winding coupled in series with the first and second primary windings;
a first secondary circuit adapted to be magnetically coupled to the first primary circuit, and including first and second secondary windings coupled in series;
a second secondary circuit adapted to be magnetically coupled to the second primary circuit, and including third and fourth secondary windings coupled in series;
a magnetic core structure including:
a first cell structure including a first center leg around which the first primary winding and the first and second secondary windings are coiled; and
a second cell structure including a second center leg around which the second primary winding and the third and fourth secondary windings are coiled, wherein the second cell structure is stacked relative the first cell structure, in which the second center leg is aligned with the first center leg along an axis;
a first printed circuit board (PCB) printed with the first secondary winding;
a second PCB printed with the first primary winding; and
a third PCB printed with the second secondary winding;
in which the magnetic core structure includes: a trench receiving the first, second, and third PCBs; and a center leg penetrating the first, second, and third PCBs, and around which the first secondary winding, the first primary winding, and the second secondary winding are coiled.

7. The power conversion apparatus of claim 6, further comprising:
a fourth PCB printed with the third secondary winding;
a fifth PCB printed with the second primary winding; and
a sixth PCB printed with the fourth secondary winding;
wherein the magnetic core structure includes a second trench receiving the fourth, fifth, and sixth PCBs, and a second center leg penetrating the fourth, fifth, and sixth PCBs, and around which the third secondary winding, the second primary winding, and the fourth secondary winding are coiled; and
wherein the magnetic core structure segregates the first, second, and third PCBs from the fourth, fifth, and sixth PCBs.

8. The power conversion apparatus of claim 7, further comprising:
a seventh PCB printed with the inductor winding;
wherein the magnetic core structure includes a third trench receiving the seventh PCB, and a third center leg penetrating the seventh PCB, and around which the inductor winding is coiled; and
wherein the magnetic core structure segregates the seventh PCB from the first, second, third, fourth, fifth, and sixth PCBs.

9. A power conversion apparatus comprising:
primary apparatus including—first and second planar structures having respective openings, a first primary winding coiled around the opening in the first planar structure, and a second primary winding coiled around the opening in the second planar structure;
first secondary apparatus including third and fourth planar structures having respective openings and first and second secondary windings interposed by the first primary winding, wherein the first secondary winding is coiled around the opening in the third planar structure, and the second secondary winding is coiled around the opening in the fourth planar structure;
second secondary apparatus including fifth and sixth planar structures having respective openings and third and fourth secondary windings interposed by the second primary winding, wherein the third primary winding is coiled around the fifth planar structure, and the fourth primary winding is coiled around the sixth primary structure; and
a magnetic structure including:
a first cell structure including a first center leg through the openings in the first, third, and fourth planar structures; and
a second cell structure including a second center leg through the openings in the second, fifth, and sixth planar structures;
wherein the first and second cell structures are stacked with the first and second center legs aligned.

10. The power conversion apparatus of claim 9, wherein the first through sixth planar structures are first through sixth printed circuit board ("PCB") structures having the respective windings printed thereon.

11. The power conversion apparatus of claim 10, wherein:
the first, third, and fourth PCB structures are first, third, and fourth layers of a first multi-layer PCB; and
the second, fifth, and sixth PCB structures are second, fifth, and sixth layers of a second multi-layer PCB.

12. The power conversion apparatus of claim 9, further comprising:
inductor apparatus including a seventh planar structure having an opening and an inductor winding coupled in series with the first and second primary windings, wherein the inductor winding is coiled around the opening in the seventh planar structure;
wherein the magnetic structure further includes a third cell structure having a third center leg through the opening in the seventh planar structure; and
wherein the third cell structure is stacked relative to the first and second cell structures, in which the third center leg is aligned with the first and second center legs.

13. A power conversion apparatus comprising:
a first transformer structure including:
first and second planar structures having respective openings;
a first primary winding coiled around the opening in the first planar structure;
a first secondary winding coiled around the opening in the second planar structure; and
a first core element including a first center leg, wherein the first and second planar structures are stacked with the first center leg through the respective openings; and
a second transformer structure including:
third and fourth planar structures having respective openings;
a second primary winding coiled around the opening in the third planar structure;
a second secondary winding coiled around the opening in the fourth planar structure; and
a second core element including a second center leg, wherein the third and fourth planar structures are stacked with the second center leg through the respective openings, and the first and second core elements are stacked with the first and second center legs aligned.

14. The power conversion apparatus of claim 13, further comprising:
an inductor structure including:
a fifth planar structure having an opening;
an inductor winding coiled around the opening of the fifth planar structure; and
a third core element including a third center leg through the opening in the fifth planar structure, wherein the first, second, and third core structures are stacked with the first, second, and third center legs aligned.

15. The power conversion apparatus of claim 14, wherein the first transformer structure is stacked between the second transformer structure and the inductor structure.

16. The power conversion apparatus of claim 14, further comprising a capacitor on the fifth planar structure.

17. The power conversion apparatus of claim 13, wherein:
the first transformer structure further includes:
a fifth planar structure having an opening; and
a third secondary winding coiled around the opening in the fifth planar structure, wherein the first center leg extends into the opening in the fifth planar structure; and
the second transformer structure further includes:
a sixth planar structure having an opening; and
a fourth secondary winding coiled around the opening in the sixth planar structure, wherein the second center leg extends into the opening in the sixth planar structure.

18. The power conversion apparatus of claim 17, wherein:
the first planar structure is stacked between the second and fifth planar structures; and
the third planar structure is stacked between the fourth and sixth planar structures.

19. The power conversion apparatus of claim 17, further comprising:
a first rectifier device and a first capacitor on the second planar structure;
a second rectifier device and a second capacitor on the fifth planar structure;
a third rectifier device and a third capacitor on the fourth planar structure; and
a fourth rectifier device and a fourth capacitor on the sixth planar structure.

20. The power conversion apparatus of claim 13, wherein the first through fourth planar structures are first through fourth printed circuit board (PCB) structures.

21. The power conversion apparatus of claim 20, wherein:
the first PCB structure has the first primary winding printed thereon;
the second PCB structure has the first secondary winding printed thereon;
the third PCB structure has the second primary winding printed thereon; and
the fourth PCB structure has the second secondary winding printed thereon.

22. The power conversion apparatus of claim 20, wherein:
the first and second PCB structures are first and second layers of a first multi-layer PCB; and
the third and fourth PCB structures are third and fourth layers of a second multi-layer PCB.

23. The power conversion apparatus of claim 13, wherein:
the first core element has a first trench within which the first and second planar elements are stacked; and
the second core element has a second trench within which the third and fourth planar elements are stacked.

* * * * *